(12) United States Patent
Prajapati et al.

(10) Patent No.: US 10,506,584 B2
(45) Date of Patent: Dec. 10, 2019

(54) TIME DOMAIN COEXISTENCE OF RF SIGNALS

(71) Applicant: BROADCOM CORPORATION, Irvine, CA (US)

(72) Inventors: Sudhirkumar Prajapati, Bangalore (IN); Payel Banerjee, Kolkata (IN); Asish Makkattil Ratnan, Bangalore (IN); Nethi Kashi Viswanath, Dist Medak (IN); Sachin Gupta, Bangalore (IN); Neeraj Poojary, Santa Clara, CA (US); Yury Gonikberg, San Jose, CA (US); Mark Gonikberg, Los Altos Hills, CA (US); Matthew Fischer, Mountain View, CA (US); Kamesh Medapalli, San Jose, CA (US); Florin Baboescu, San Diego, CA (US); Steven Hall, Olivenhain, CA (US); Shawn Ding, San Diego, CA (US); Prasanna Desai, Elfin Forest, CA (US); Knut Terje Hermod Odman, Encinitas, CA (US); Sanjay Saha, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 823 days.

(21) Appl. No.: 14/752,730

(22) Filed: Jun. 26, 2015

(65) Prior Publication Data
US 2015/0305031 A1 Oct. 22, 2015

Related U.S. Application Data

(62) Division of application No. 13/716,540, filed on Dec. 17, 2012, now Pat. No. 9,100,108.

(Continued)

(51) Int. Cl.
*G08C 17/00* (2006.01)
*H04W 72/04* (2009.01)
(Continued)

(52) U.S. Cl.
CPC ........ *H04W 72/0446* (2013.01); *H04B 15/00* (2013.01); *H04W 16/04* (2013.01);
(Continued)

(58) Field of Classification Search
CPC .............. Y02B 60/50; H04W 52/0216; H04W 52/0229; H04W 76/048; H04W 52/0225
(Continued)

(56) References Cited

U.S. PATENT DOCUMENTS

2007/0056605 A1  3/2007  Fraklin et al.
2007/0058605 A1  3/2007  Meylan et al.
(Continued)

*Primary Examiner* — Atique Ahmed
(74) *Attorney, Agent, or Firm* — Morgan, Lewis & Bockius LLP

(57) ABSTRACT

Various methods and systems are provided for time domain coexistence of RF signals. In one example, among others, a method includes obtaining access to a WLAN channel during a free period of a coexisting cellular connection, providing a RDG to allow another device to transmit for a duration corresponding to at least a portion of a TXOP, and receiving a transmission during the duration. In another example, a method includes obtaining access to a WLAN channel during a transmission period of a coexisting cellular connection and providing a protection frame to defer transmissions from another device for a duration corresponding to at least a portion of a TXOP. In another example, a method includes determining a shift of a BT transaction based at least in part upon a schedule of cellular communications and shifting at least a portion of the BT transaction based upon the determined shift.

20 Claims, 25 Drawing Sheets

Related U.S. Application Data

(60) Provisional application No. 61/570,922, filed on Dec. 15, 2011.

(51) Int. Cl.
*H04W 52/02* (2009.01)
*H04B 15/00* (2006.01)
*H04W 74/04* (2009.01)
*H04W 16/04* (2009.01)
*H04W 16/14* (2009.01)
*H04W 72/12* (2009.01)
*H04W 88/04* (2009.01)

(52) U.S. Cl.
CPC ..... *H04W 52/0209* (2013.01); *H04W 72/044* (2013.01); *H04W 74/04* (2013.01); *H04W 16/14* (2013.01); *H04W 72/1215* (2013.01); *H04W 88/04* (2013.01); *Y02D 70/00* (2018.01); *Y02D 70/122* (2018.01); *Y02D 70/1244* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/24* (2018.01)

(58) Field of Classification Search
USPC ....................................................... 370/311
See application file for complete search history.

(56) References Cited

U.S. PATENT DOCUMENTS

| | | |
|---|---|---|
| 2007/0275671 A1 | 11/2007 | Hwang et al. |
| 2007/0275746 A1* | 11/2007 | Bitran ................ H04W 16/14 455/509 |
| 2008/0170558 A1 | 7/2008 | Jokela et al. |
| 2009/0003307 A1* | 1/2009 | Yang .................... H04W 56/00 370/350 |
| 2009/0017767 A1 | 1/2009 | Mashimo |
| 2009/0197639 A1* | 8/2009 | Khairmode ........... H04W 88/06 455/553.1 |
| 2009/0219904 A1* | 9/2009 | Khairmode ........... H04W 88/06 370/338 |
| 2010/0039973 A1 | 2/2010 | Cavalcanti et al. |
| 2010/0165907 A1 | 7/2010 | Chu et al. |
| 2010/0203832 A1* | 8/2010 | Russell ................. H04B 1/525 455/41.2 |
| 2010/0278065 A1 | 11/2010 | Sun et al. |
| 2011/0225305 A1 | 9/2011 | Vedantham et al. |
| 2011/0274080 A1* | 11/2011 | Ko ........................ H04W 76/14 370/329 |
| 2012/0008490 A1 | 1/2012 | Zhu |
| 2012/0020231 A1 | 1/2012 | Chen et al. |
| 2012/0188907 A1* | 7/2012 | Dayal ............... H04W 72/1215 370/254 |
| 2012/0213116 A1* | 8/2012 | Koo .................... H04B 1/1027 370/253 |
| 2013/0010766 A1* | 1/2013 | Sadek ............... H04W 72/1215 370/336 |
| 2013/0058314 A1* | 3/2013 | Broise .............. H04W 72/1215 370/336 |

* cited by examiner

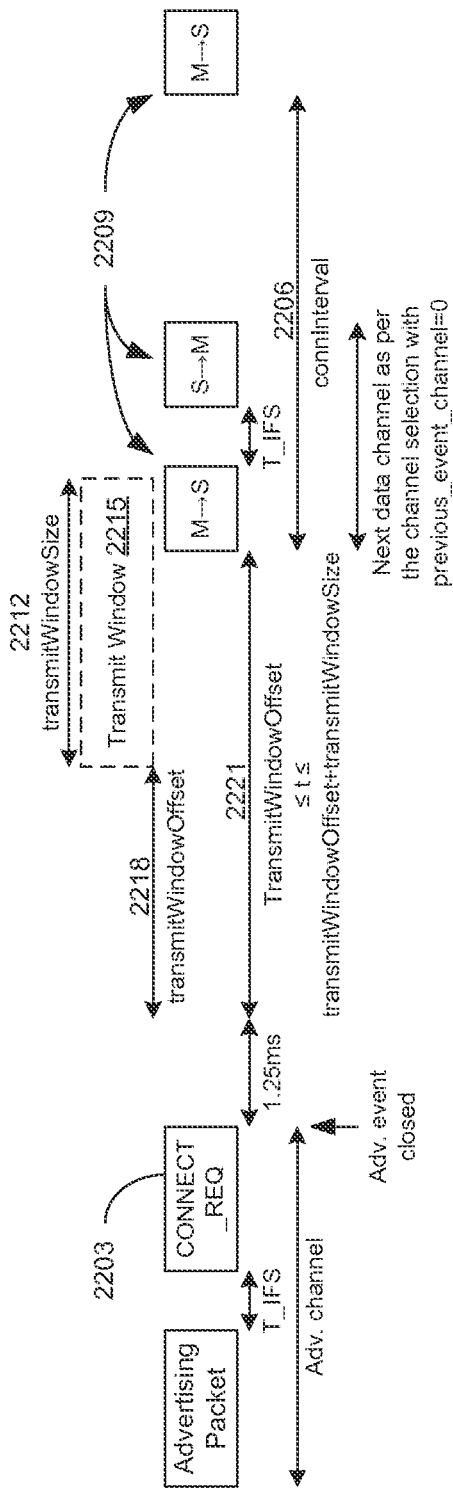
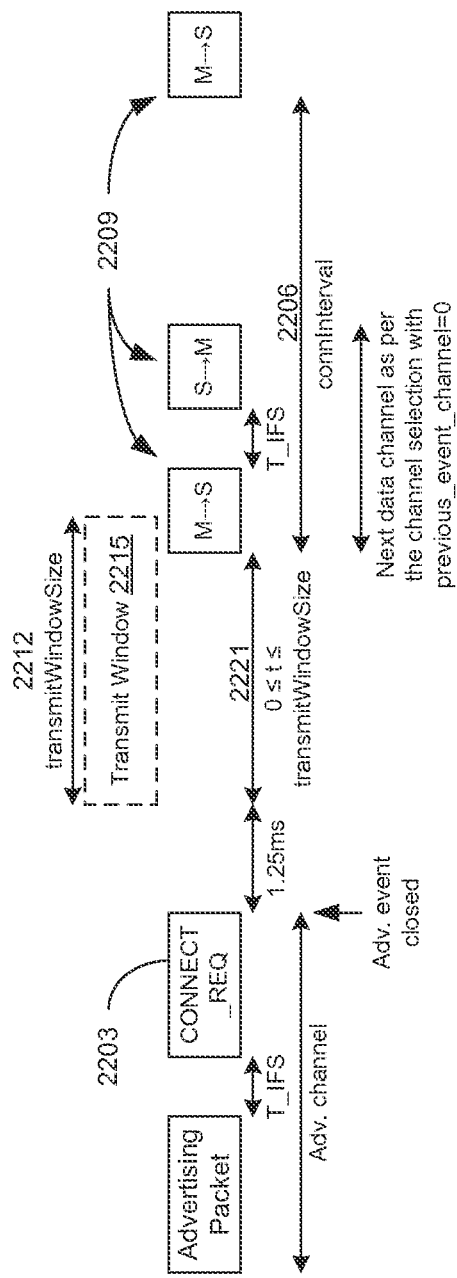
FIG. 22A
FIG. 22B

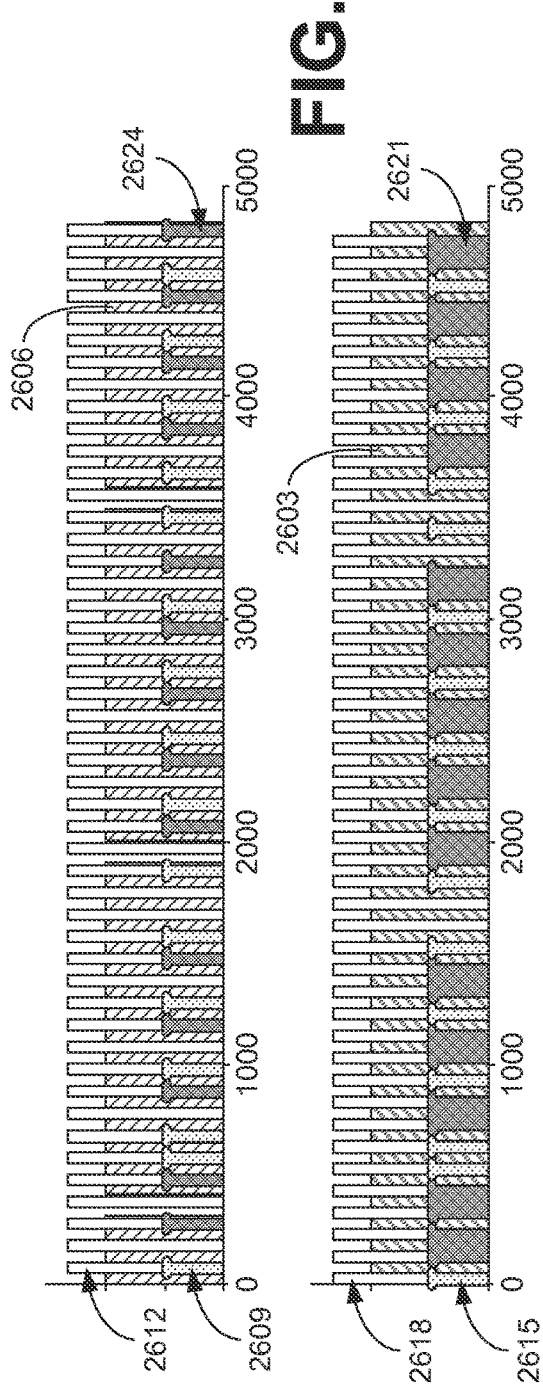
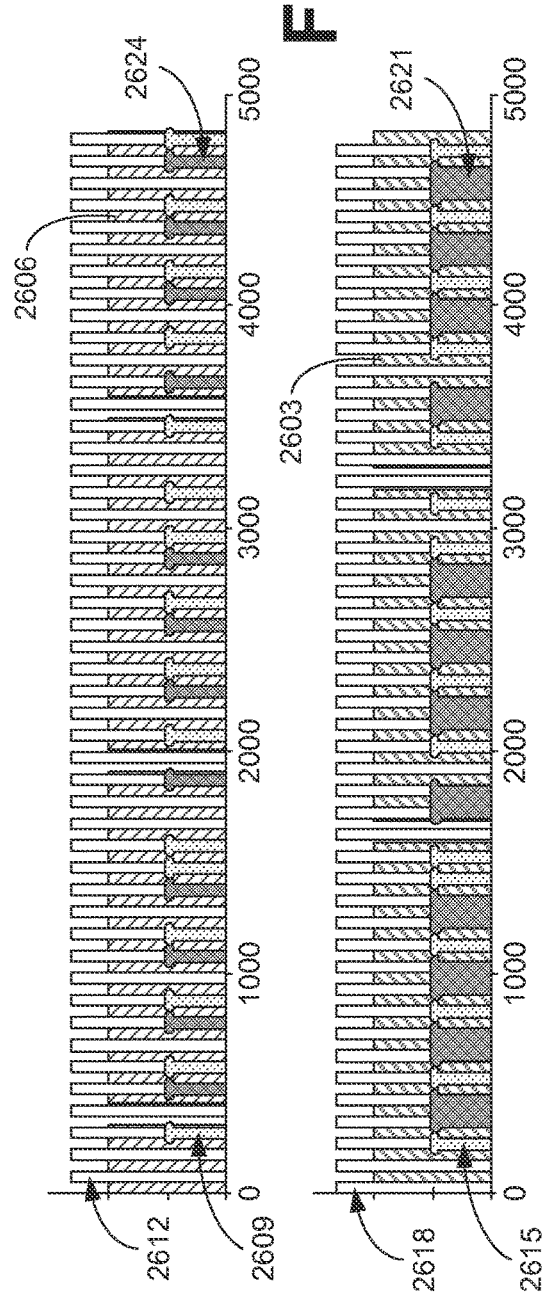

TIME DOMAIN COEXISTENCE OF RF SIGNALS

CROSS REFERENCE TO RELATED APPLICATIONS

This application claims the benefit of priority under 35 U.S.C. § 119 from U.S. Provisional Patent Applications entitled "COEXISTENCE SYSTEMS AND METHODS," having Ser. No. 61/570,922, filed on Dec. 15, 2011, and is a divisional application of U.S. Patent Applications entitled "THE DOMAIN COEXISTENCE OF RF SIGNALS," having Ser. No. 13/716,540, filed on Dec. 17, 2012, which are incorporated herein by reference in their entirety.

BACKGROUND

Communication systems typically operate in accordance with one or more communication standards. Wireless communication systems may operate in accordance with one or more standards including, but not limited to, Institute of Electrical and Electronics Engineers (IEEE) 802.11, Wi-Fi Direct, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof. Radio frequency (RF) signals of the wireless communication systems are transmitted over a wide range of frequencies. When RF signals are communicated at frequencies that overlap or are in close proximity to each other, the RF signals can mutually interfere with each other resulting in degraded performance. Examples of RF signals that can mutually interfere include, e.g., cellular long term evolution (LTE) signals, wireless local area network (WLAN) signals, Bluetooth (BT) signals, and BT low energy (BTLE) signals.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 22A and 22B are an example of the coordination of coexistent Bluetooth low energy and cellular communications by the communication device of FIG. 16 in accordance with various embodiments of the present disclosure.

FIG. 26A through 26F are examples of the coordination of coexistent Wi-Fi, Bluetooth and cellular communications by the communication device of FIG. 24 in accordance with various embodiments of the present disclosure.

DETAILED DESCRIPTION

Figure 1:
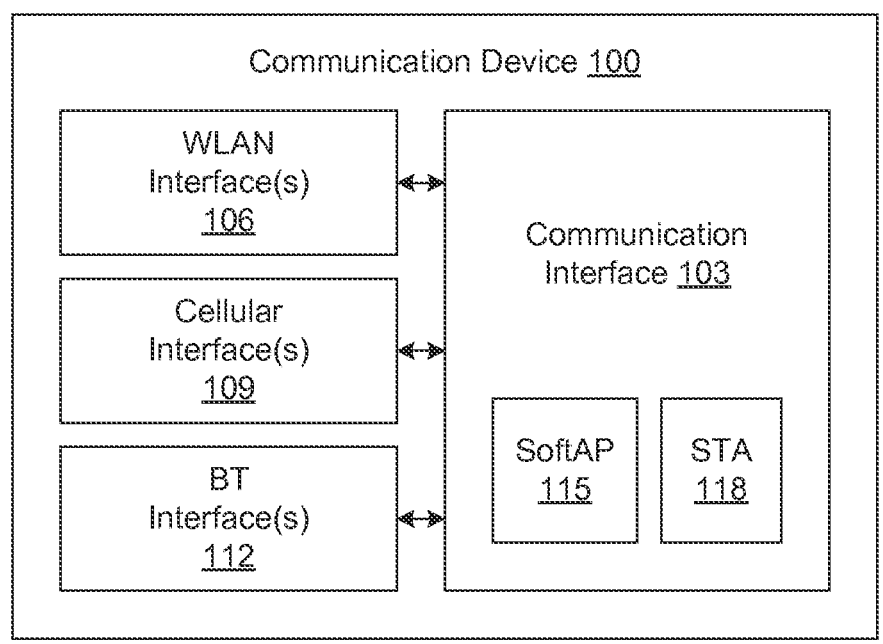
FIG. 1 is a graphical representation of an example of a communication device in accordance with various embodiments of the present disclosure.

The present disclosure relates to coexistence of radio frequency (RF) signals in communication devices such as, e.g., mobile communication devices. Coordination of different RF signals can reduce or eliminate mutual interference between the RF signals. Each communication device can include one or more radio transceiver(s). Typically, a transceiver includes a data modulation stage and an RF stage. The data modulation stage (baseband process) converts data to baseband signals in accordance with the particular wireless communication standard. The RF stage (e.g., a transmitter section and/or receiver section) converts between baseband signals and RF signals. The RF stage may convert directly from baseband to RF or may include one or more intermediate frequency stage(s).

Currently, IEEE 802.11 a/b/g/n (Wi-Fi) is the ubiquitous connectivity technology employed at home, work, and other venues through, e.g., a wireless local area network (WLAN). Mobile communication devices such as, e.g., mobile phones, tablet computers, electronic book readers, etc. may include Wi-Fi capabilities. Other communication devices such as, e.g., wireless routers and hotspot devices also support Wi-Fi capabilities. These communication devices may also support other wireless communication technologies such as, e.g., Bluetooth (BT) and/or BT low energy (BTLE) to allow for communication with other devices that support BT and/or BTLE. In addition, these communication devices may support cellular communications such as, e.g., a cellular data connection such as third-generation (3G), fourth-generation (4G), long term evolution (LTE), or other data communication standard. For example, a communication device can offer tethering capabilities for sharing a LTE data connection with other communication devices over, e.g., a WLAN for Wi-Fi communications, a personal area network (PAN) for BT and/or BTLE communications, and/or other wireless connections. The tethering service can be capable of providing software enabled access point (AP) services as a "soft" access point (SoftAP). In such a configuration, the communication device supporting SoftAP may provide data communications over a WLAN connection to other wireless client stations (STAs).

The coexistence of an LTE communication signal with one or more of the other wireless communication signals can produce mutual interference between the signals, resulting in degraded performance of the wireless technologies. For instance, if the operating frequencies of the WLAN and LTE connections are close together, then the performance of both technologies may be degraded due to mutual interference between the RF signals. When LTE and WLAN coexist, simultaneous operation of an LTE interface in a transmit (TX) mode and a WLAN interface in a receive (RX) mode can inhibit or prevent proper decoding of frames received over the WLAN connection due to the LTE transmissions. This can result in an increase in the drop rate, elevated packet loss, and additional transmission retries. Similarly, transmissions over the WLAN may be restricted to protect LTE reception of data packets and/or frames.

With reference to FIG. 1, shown is a communication device 100 in accordance with various embodiments of the present disclosure. The communication device 100 may correspond to a handheld device, a mobile device, a desktop computer, a laptop computer, personal digital assistants, cellular telephones, smartphones, set-top boxes, music players, web pads, tablet computer systems, game consoles, electronic book readers, wireless routers, hotspot devices or other devices with like capability. The communication device 100 includes a communication interface 103, one or more wireless interface(s) such as, e.g., WLAN interface(s) 106, cellular network interface(s) 109, BT interface(s) 112, and/or other components. The communication interface 103 may be configured to support wireless communication to wireless clients using Wi-Fi, Bluetooth, and/or other wireless technologies via the wireless interfaces 106, 109, and 112.

The communication interface 103 may coordinate communications through the different wireless interfaces 106, 109, and 112. For example, the communication interface 103 may provide wireless access point services as a "soft" access point (SoftAP) 115 or may provide services as a wireless client station (STA) 118 that communicates with a wireless access point (WAP) or another SoftAP. The WLAN interface(s) 106 may correspond to one or more interface(s) which are configured to support Wi-Fi communications. In some embodiments, multiple WLAN interfaces 106 may be present to support multiple WLAN networks; multiple basic service sets (BSS), etc. The cellular network interface(s) 109 may correspond to one or more interfaces which are configured to provide access to a cellular network such as a 3G or 4G network, an LTE network, a WiMAX network, and/or other types of networks. The cellular network interface(s) 109 can support high speed data transfer over the cellular network. The BT interfaces 112 may correspond to one or more interface(s) which are configured to support BT and/or BTLE communications. The communication device 100 may also include other types of network interfaces such as, for example, Ethernet interfaces, universal serial bus (USB) network interfaces, token ring interfaces, and so on. In addition, the communication device 100 may be used for other activities such as, e.g., web browsing, gaming, and/or other user interactive applications.

Figure 2:
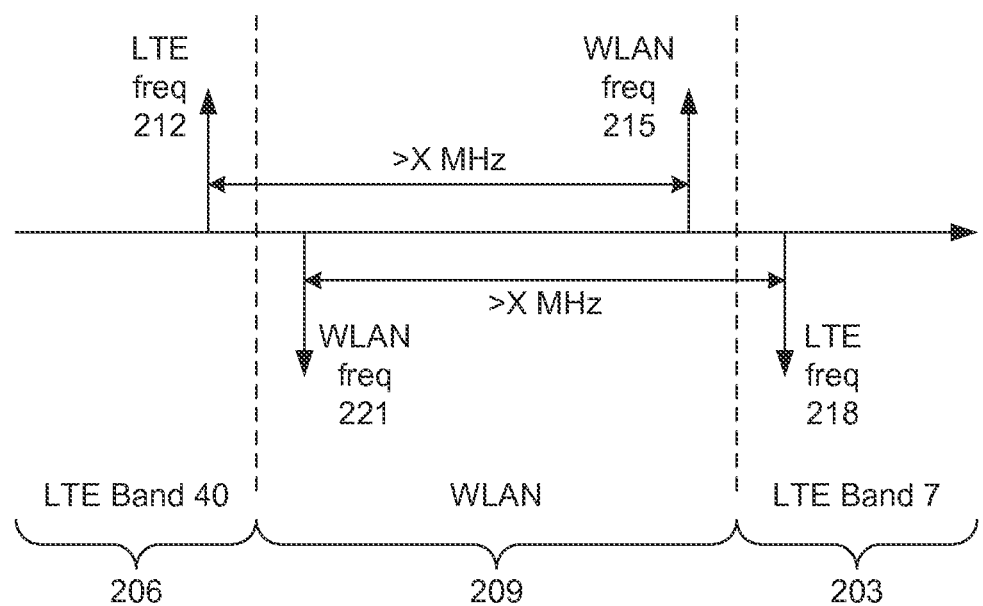
FIG. 2 is a graphical representation of an example of coexisting radio frequency (RF) signals of the communication device of FIG. 1 in accordance with various embodiments of the present disclosure.

The communication interface 103 can monitor wireless communications through the wireless interfaces 106, 109, and 112 to determine whether coordination of coexisting RF communications is needed to avoid interference. The determination may be based upon one or more factor(s) such as, e.g., transmission frequencies, transmission powers, type of communication, etc., which may be received from the different wireless interfaces 106, 109, and 112. For example, interference may be unlikely for specific combinations of wireless communications. When those defined conditions exist, the communication interface 103 may determine that coordination of the coexistent RF signals is not needed. In other instances, coordination of combinations of wireless communications may be desired because of the proximity of the operational frequencies of the RF signals. For example, the coexistence of an LTE communication signal with WLAN, BT, and/or BTLE signals may result in mutual interference. LTE communications can occur in band 7 (2500-2570 MHz and 2620-2690 MHz) 203 or band 40 (2300-2400 MHz) 206, which are both adjacent to the WLAN 2.4 GHz industrial, scientific and medical (ISM) band (2400-2500 MHz) 209 as illustrated in FIG. 2. If the frequency separation between the LTE and WLAN operating frequencies is sufficiently large, then simultaneous transmission and/or reception may be allowed without coordination of the LTE and WLAN communications.

Whether the separation between the operating frequencies of the RF signals is sufficient for simultaneous communication may be determined by comparing the frequency difference with a predefined threshold (e.g., a threshold of X MHz). Different thresholds may be defined for different combinations of RF signals. In addition, the threshold value may be adjusted based at least in part upon the transmission power of the RF signals. For example, the threshold value may be scaled or weighted based at least in part upon the transmission powers of the RF signals. The separation between the operating frequencies may be less when one or both of the signals are transmitted at a lower power level. In some cases, the transmit powers may be low enough to allow for coexistence with minimal frequency separation. In some implementations, lookup tables may be used to determine the allowable frequency separation based upon the transmission power levels.

In the case where the communication device 100 is acting as a SoftAP 115 via an LTE connection, then the communication interface 103 can coordinate the LTE and WLAN communications by setting up the BSS at a channel that sufficiently far away from the LTE operating frequency reduce or avoid mutual interference. For example, if the LTE operating frequency 212 is at the edge of band 40 (206), then the BSS can be setup at a WLAN operating frequency 215 at the opposite end of the ISM band 209 with a separation that is greater than the predefined threshold (e.g., >X MHz) as shown in FIG. 2. If the separation exceeds the predefined threshold, then mutual interference may be considered negligible and simultaneous transmission and/or reception of both RF signals may be allowed. To minimize the mutual interference, the WLAN channel that is furthest from the LTE operating frequency 212 may be used. If the separation between the operating frequencies does not meet and/or exceed the predefined threshold, then further coordination of the RF signals may be needed to reduce the likelihood of mutual interference. If the LTE operating frequency 218 is at the edge of band 7 (203), then the BSS can be setup at a WLAN operating frequency 221 at the opposite end of the ISM band 209 with a separation that is greater than the predefined threshold to minimize interference.

If the communication device 100 is a mobile communication device, then situations may arise where the LTE operating frequency may switch between band 40 (206) and band 7 (203) because of handover. For example, the LTE communications may originally be carried out at operating frequency 212 in band 40 with WLAN communications at operating frequency 215. If handover results in the LTE communications shifting from LTE operating frequency 212 to LTE operating frequency 218 of band 7 (203), then the communication interface 103 can switch the WLAN communications from WLAN operating frequency 215 to WLAN operating frequency 221 to avoid interference. All connected STAs would automatically follow the WLAN operating frequency of the SoftAP 115 after connection loss. In this way, the communication interface 103 monitors the LTE operating frequency and dynamically switches the WLAN operating frequency to reduce mutual interference based at least in part upon the monitored LTE operating frequency.

If the communication interface 103 determines that coordination of coexisting RF signals is needed to mitigate mutual interference, then time domain coordination of the communications may be carried out by the communication interface 103. Initially, communication schedule(s) may be obtained by the communication interface 103. For example, a published LTE communication schedule may be communicated to the communication interface 103 by the cellular interface 109 implementing the LTE connection. The LTE communication schedule indicates LTE transmission (TX) periods, LTE receive (RX) periods, and traffic free periods during which no LTE communications are scheduled. When the communication interface 103 has information about the communication schedule, the communication interface 103 can coordinate the reception, transmission, and/or protection of other RF signals such as, e.g., WLAN signals. In some situations, the communication interface 103 may determine the communication schedule by generating a predictor map based upon TX and RX indications received from the cellular interface 109 supporting the LTE or other cellular connection.

Figure 3:
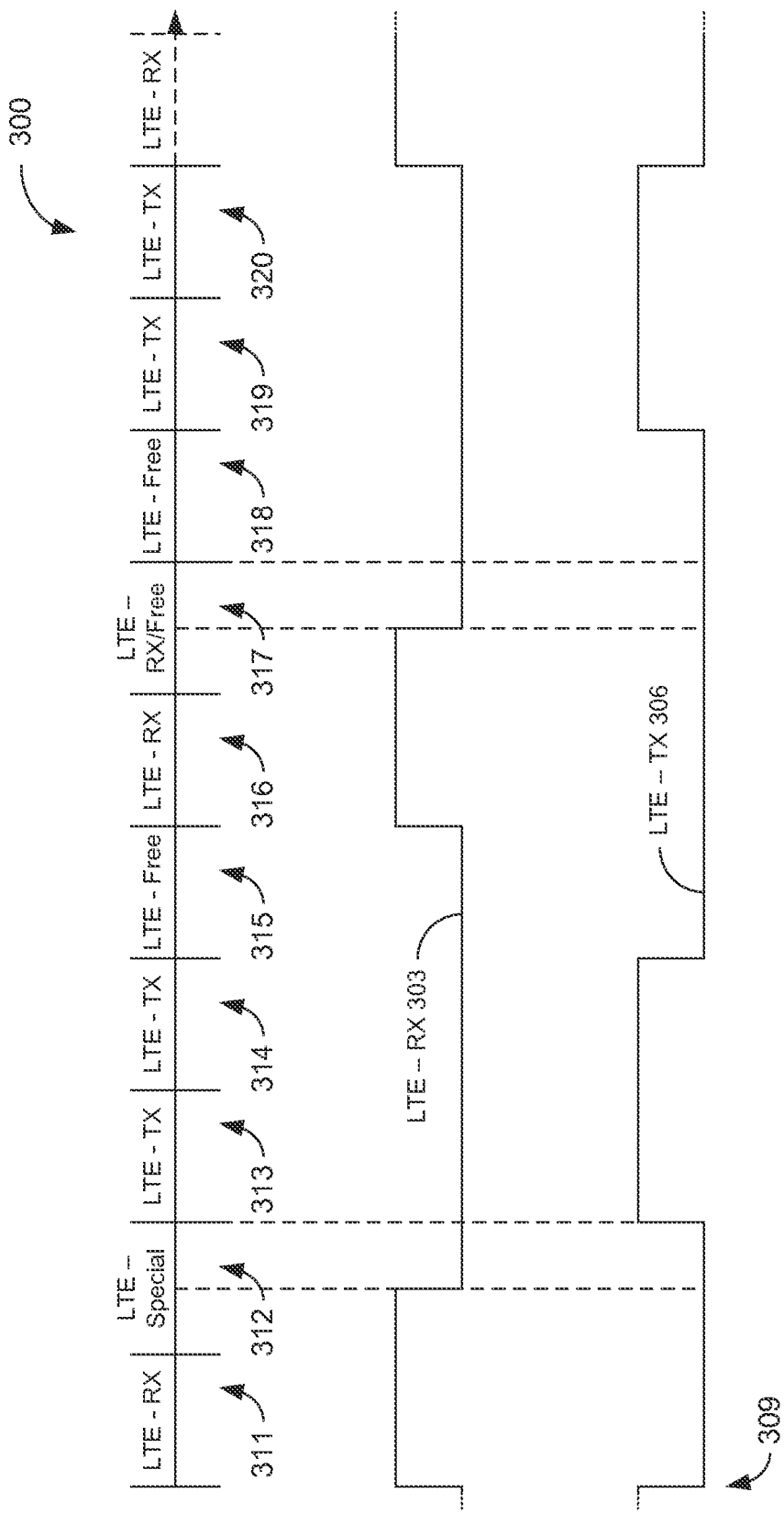
FIG. 3 illustrates an example of a predictor map for cellular communications of the communication device of FIG. 1 in accordance with various embodiments of the present disclosure.

Referring to FIG. 3, shown is an example of an LTE predictor map 300 generated from the indications of LTE-RX 303 and LTE-TX 306. The LTE-RX 303 and LTE-TX 306 indications may be provided over a two-wire connection where the LTE-RX 303 signal is asserted high when the cellular interface 109 is receiving LTE communications and the LTE-TX 306 signal is asserted high when the cellular interface 109 is transmitting LTE communications. In the example of FIG. 3, the LTE predictor map 300 includes an access identifier for each 1 ms LTE subframe over a 10 ms window. In other implementations, different subframe lengths and/or window lengths may be used to map the communication schedule. The communication interface 103 determines the access identifier of each subframe based upon the LTE-RX 303 and LTE-TX 306 signals. The access identifier indicates the communication status during the subframe period such as, e.g., LTE transmit (LTE-TX), LTE receive (LTE-RX), no LTE transmit or receive traffic (LTE-Free), a combination of LTE transmissions, LTE receptions, and/or no LTE traffic (LTE-Special), or a combination of LTE receptions and no LTE traffic (LTE-RX/Free). The LTE predictor map 300 helps the communication interface 103 to coordinate coexisting LTE and WLAN signals by using the generated access pattern to predict the status of the next subframe period.

The communication interface 103 monitors LTE-RX 303 and LTE-TX 306 signals for the duration of each subframe (e.g., a period of 1 ms) and at the end of the subframe period updates the subframe status based upon the signal states. In the example of FIG. 3, the communication interface 103 initially determines when a transition occurs in the LTE-RX 303 and/or LTE-TX 306. In the example of FIG. 3, LTE-RX 303 goes high and LTE-TX 306 goes low at point 309. Because, LTE-RX 303 remains high and LTE-TX 306 remains low over the entire subframe period, the access identifier for subframe 311 is LTE-RX. Because LTE-RX 303 transitions to low during subframe 312 and LTE-TX 306 transitions to high at the end of the subframe period, the access identifier for subframe 311 is LTE-Special, which indicates that both reception and transmission are possible during that subframe period. The access identifiers for subframes 313 and 314 are LTE-TX because LTE transmission is maintained until the end of subframe 314, when LTE-TX 306 transitions to low. The access identifier for subframe 315 is LTE-Free since no LTE communications occur over the subframe period.

LTE-RX 303 is high over subframe 316, indicating that the communication device 100 is scheduled to receive LTE signals. LTE-RX 303 goes low during subframe 317 and remains low until the end of subframe 320. Because no LTE communications occur for the second portion of subframe 317 and over the period of subframe 318, the access identifier for subframe 317 is LTE-RX/Free and the access identifier for subframe 318 is LTE-Free. At the beginning of subframe 319, LTE-TX 306 goes high and remains high until the end of the window where LTE-RX 303 goes high and LTE-TX 306 goes low just as at point 309. Accordingly, the access identifiers for both subframes 319 and 320 are LTE-TX. In this way, the communication interface 103 can generate an LTE predictor map 300 including the access identifiers for ten subframes 311-320. The LTE predictor map 300 may be used to predict the access pattern and thus the status of the next LTE subframe(s), allowing the communication interface 103 to coordinate the WLAN (or other) communications.

The LTE-RX 303 and LTE-TX 306 indications provided over the two-wire connection may also be used to predict the LTE measurement gap, which may be used for periodic WLAN scans. For a WLAN periodic active scan, a STA sends a probe request message and waits for a probe response message to be returned from an AP within a defined time period. When a communication device 100 acting as a STA 118, the probe response message may not be properly decoded if there is an LTE transmission at the same time. To avoid this situation, periodic scanning may be performed during the LTE measurement gap, where the cellular interface 109 is also in a receive mode. The LTE measurement gap has a duration from about 6 ms to about 7 ms at an interval of about 40 ms or about 80 ms. The communication interface 103 can monitor the LTE-RX 303 indication to find when it is asserted high for about 6 ms to about 7 ms. By assuming that this is the LTE measurement gap, the gap interval may be confirmed by monitoring for the LTE measurement gap over 4-5 gap intervals (about 160 ms to about 400 ms). Based upon the predicted LTE measurement gap length and interval, the communication device 100 can wait for the LTE measurement gap to improve the success of the periodic scanning. In addition, the LTE predictor map 300 should not be updated for the subframes where the LTE measurement gap is observed.

Various schemes may be utilized to reduce or eliminate mutual interference between coexisting RF signals. The transmission and/or reception of the coexisting RF signals may be coordinated by the communication interface 103 based upon the communication schedule(s) and/or the predictor map to aid in proper reception and decoding of the transmitted packets and/or frames. Some or all of the schemes may be applied when the communication device 100 is acting as a SoftAP 115 and/or as a STA 118.

Figure 4:
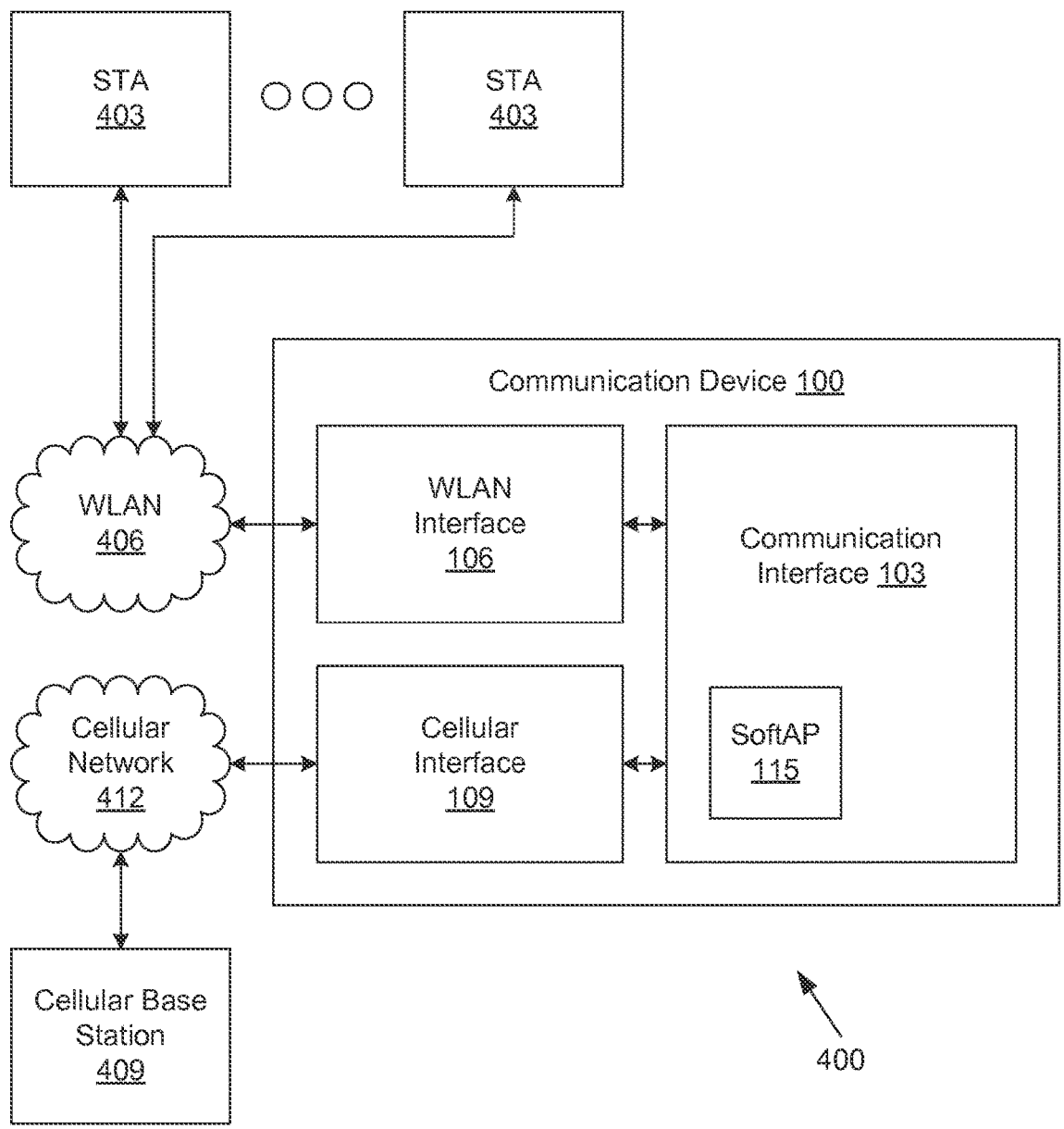
FIG. 4 is an example of a networked environment including a communication device supporting coexisting Wi-Fi and cellular communications in accordance with various embodiments of the present disclosure.

Referring to FIG. 4, shown is an example of a networked environment 400 including a communication device 100 with coexisting Wi-Fi and cellular communications. In the example of FIG. 4, the communication device 100 is providing wireless access point services as a SoftAP 115 to one or more Wi-Fi client station (STA) 403 that are communicatively coupled via an IEEE 802.11 a/b/g/n network such as, e.g., WLAN 406 or other similar wireless network. Each of the STAs 403 may correspond to a handheld device, a mobile device, a desktop computer, a laptop computer, personal digital assistant, cellular telephone, smartphone, set-top box, music player, web pad, tablet computer system, game console, electronic book reader, or other devices with like capability.

The communication device 100 is also communicatively coupled to a cellular base station 409 via cellular network 412. The cellular network 412 may correspond to, e.g., an LTE or WiMAX network. Acting as a SoftAP allows the communication device 100 to facilitate tethering the one or more STAs 403 through the cellular connection such as, e.g., an LTE data connection. Tethering allows the STAs 403 to access resources provided by through the cellular network 412 and base station 409. For example, the cellular base station 409 may provide connectivity to the Internet and/or another network for the communication device 100.

When Wi-Fi transmissions from a STA 403 occur during LTE or other cellular transmissions by the communication device 100, the SoftAP 115 may not be able to acknowledge (ACK) the received frames or packets because of mutual interference between the coexisting WLAN and LTE signals. Because the SoftAP 115 may not be able to properly decode received frames because of the LTE transmissions, this may result in retry, rate drop, and/or packet loss at the STA 403. To avoid the effects of mutual interference, the communication interface 103 can coordinate WLAN communications so that frames or packets are received from the STAs 403 during an LTE-RX or LTE-Free subframe. Reverse direction protocol (RDP) and/or clear-to-send to self (CTS2self) messaging may be used for time domain coordination of the coexisting RF signals.

Figure 5:
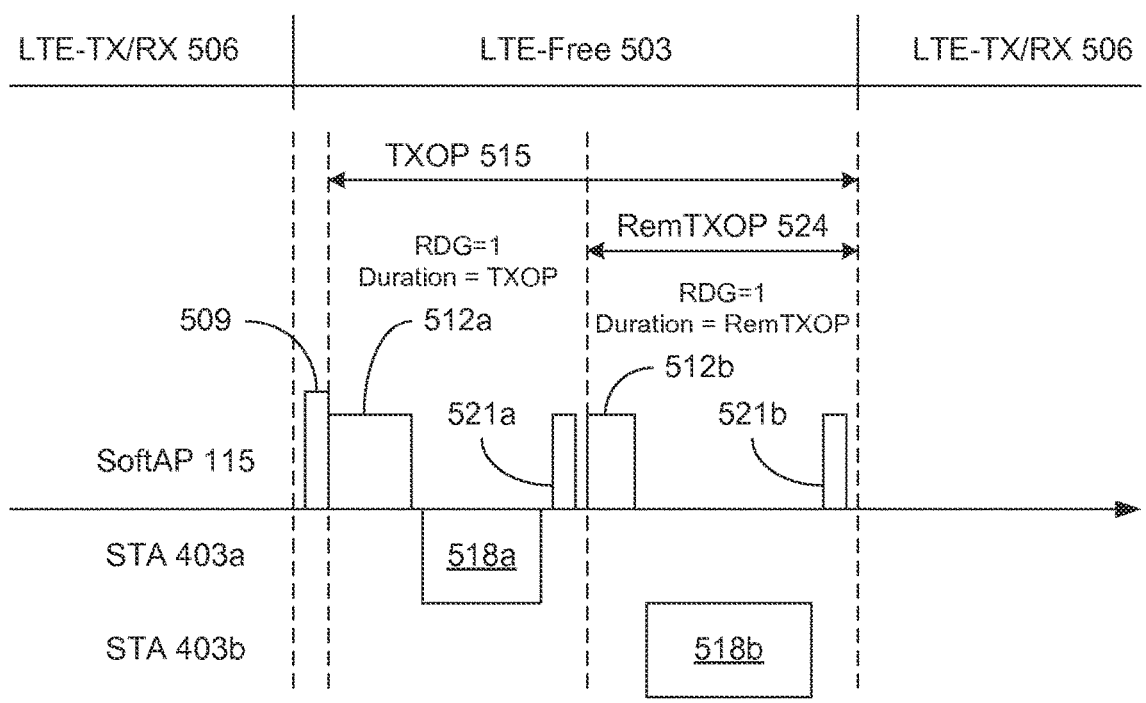
FIGS. 5, 6, and 7 are examples of the coordination of coexistent Wi-Fi and cellular communications by the communication device of FIG. 4 in accordance with various embodiments of the present disclosure.

Referring to FIG. 5, shown is an example of the coordination of coexistent Wi-Fi and cellular communications using a reverse direction grant (RDG) when the communication device 100 is acting as a SoftAP 115 for one or more STA(s) 403 of the WLAN 406 (FIG. 4). When a STA 403 transmits during a transmission period of the cellular interface 109, the SoftAP 115 may not be able to acknowledge the frames because of mutual interference between the RF signals. The SoftAP 115 may not be able to properly decode the frames during the cellular transmission period, causing retry, rate drop, and possible packet loss. To avoid issues with mutual interference, the communication interface 103 can coordinate the coexisting RF communications during a traffic free period of the cellular communications.

In the example of FIG. 5, the communication interface 103 may obtain the communication schedule for an LTE connection by, e.g., generating an LTE predictor map 300 (FIG. 3). Based upon the LTE communication schedule, the communication interface 103 can determine that the next traffic free (LTE-Free) subframe period 503 of the LTE communications falls between, e.g., transmitting and/or receiving frames (LTE-TX/RX) 506. At the beginning of the LTE-Free subframe period 503, the SoftAP 115 of the communication device 100 and the STAs 403 of the WLAN 406 (FIG. 4) attempt to obtain contention free access to the WLAN communication channel during a contention phase 509. Enhanced distributed channel access (EDCA) parameters may be set to give the SoftAP 115 a better chance of obtaining access of the WLAN channel than the STA(s) 403 of the WLAN 406. For example, the arbitration inter-frame space (AIFS) of the SoftAP 115 may be the sum of a short inter-frame space (SIFS) and two slot times while the AIFS of the STAs 403 may be the sum of the SIFS and a larger AIFS number of slot times. A transmit opportunity (TXOP) of the SoftAP 115 may be set to 10 ms for all access categories (AC) and the TXOP of the STAs 403 may be set to 0 ms for best effort (BE) and less than 1 ms for video (VI) and voice (VO). The minimum and maximum contention windows (CWs) for the SoftAP 115 may be $CW_{min}=7$ and $CW_{max}=15$ for BE, $CW_{min}=1$ and $CW_{max}=3$ for VI, and $CW_{min}=3$ and $CW_{max}=7$ for VO and the CWs for the STAs 403 $CW_{min}=31$ and $CW_{max}=1023$ for BE, $CW_{min}=7$ and $CW_{max}=15$ for VI, and $CW_{min}=15$ and $CW_{max}=31$ for VO. By utilizing these EDCA parameters, the SoftAP 115 can obtain contention free access to the WLAN channel and maximize the utilization of the LTE-Free periods by avoiding further contention between the STAs 403.

Once the contention phase 509 is resolved, the SoftAP 115 may use a reverse direction grant (RDG) 512 to allow a STA 403 to transmit over the WLAN channel for a duration corresponding to at least a portion of a TXOP 515 of the LTE-Free subframe period 503. In the example of FIG. 5, the TXOP 515 extends from the end of the contention phase 509 to the end of the LTE-Free subframe period 503. The SoftAP 115 sends a RDG frame 512a to a STA 403a after obtaining contention free access to the WLAN channel. The RDG frame 512a grants the use of the WLAN channel to the STA 403a for a duration less than or equal to remaining portion of the TXOP 515 of the LTE-Free subframe period 503 at the time of the receipt of the RDG grant. The RDG frame 512a may include a RDG flag that is set to 1 to indicate a reverse direction grant is provided to the designated STA 403 and/or a duration field in a MAC header specifying the duration during which the STA 403 may transmit. The duration is set such that the STA transmission ends before the next LTE-TX/RX subframe period 506 starts.

With the grant of RDG frame 512a, the STA 403a may then transmit one or more frames 518a for at least a portion of the duration. Frames 518a may contain acknowledgement information for RDG frame 512a, in addition to any new frames that are being sent from STA 403a to SoftAP 115. If the frames 518a of the STA 403a exceed the specified duration (e.g., duration=TXOP 515), then the frames 518a may be broken into parts for transmission. If the STA 403a does not have enough frames 518a to utilize the entire duration, then the SoftAP 115 may grant access to another STA 403b for the remaining portion of the TXOP 515. When the frames 518a have been received from the STA 403a, the SoftAP 115 sends an acknowledgement (ACK) 521a or block acknowledgement (BlockACK) confirming receipt and then may send another RDG frame 512b to another STA 403b to grant the use of the WLAN channel for the remaining portion of the TXOP 515 (e.g., duration=RemTXOP 524). With the grant of RDG frame 512b, the other STA 403b may then transmit one or more frames 518b for at least a portion of RemTXOP 524. When the frames are received, the SoftAP 115 sends an acknowledgement (ACK) 521b (or BlockACK). As with STA 403a, frames may be separated so that the specified duration is not exceeded. If a portion of the TXOP 515 still remains after transmission of the frames 518b, the remaining portion may be granted to a third STA 403 as can be understood.

Figure 6:
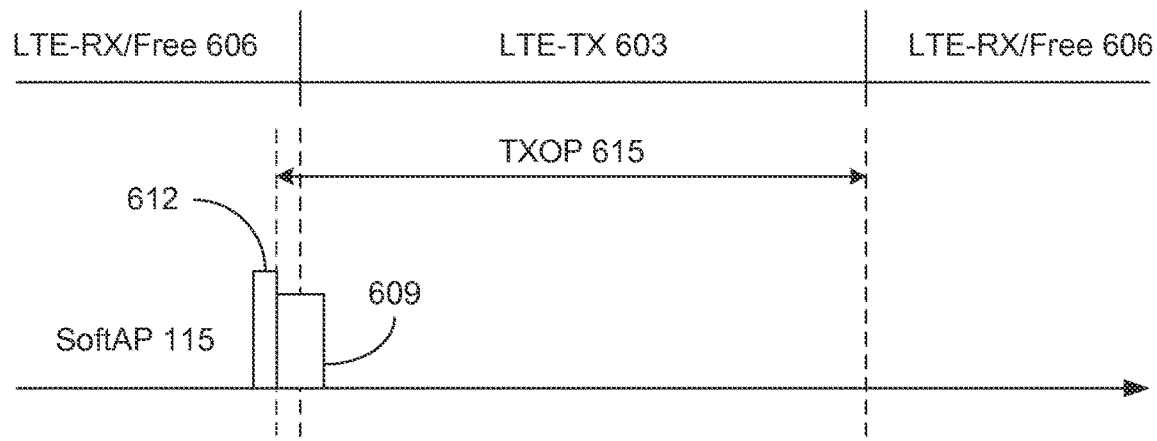

Mutual interference may also be avoided by restricting transmissions of the STAs 403 during transmission periods of the cellular interface 109. Referring to FIG. 6, shown is an example of the coordination of coexistent Wi-Fi and cellular communications using a clear-to-send to self (CTS2self) frame when the communication device 100 is acting as a SoftAP 115 for one or more STA(s) 403 of the WLAN 406 (FIG. 4). Based upon the communication schedule, the communication interface 103 can determine that the next transmission (LTE-TX) subframe period 603 of the LTE communications falls between, e.g., receiving and/or traffic free frames (LTE-RX/Free) 606. To prevent the STAs 403 from transmitting during the LTE-TX subframe period 603, the SoftAP 115 may send a CTS2self frame 609 after obtaining contention free access of the WLAN channel during contention phase 612. The CTS2self frame 609 is sent in the beginning of the LTE-TX subframe period 603 with a duration field in the MAC header set to the length of the LTE-TX subframe period 603, which is less than or equal to TXOP 615. When the STAs 403 receive the CTS2self frame 609, the STAs 403 update their network allocation vector (NAV) with the duration specified in CTS2self frame 609 and defer their transmissions until after the duration has passed. By sending the CTS2self frame 609 in the beginning of the LTE-TX subframe period 603, the SoftAP 115 makes sure that none of the STAs 403 transmit frames during the LTE-TX subframe period 603. In this way, mutual interference between the WLAN and LTE transmissions is avoided, reducing the retry, rate drop, and packet loss that may occur otherwise.

Figure 7:
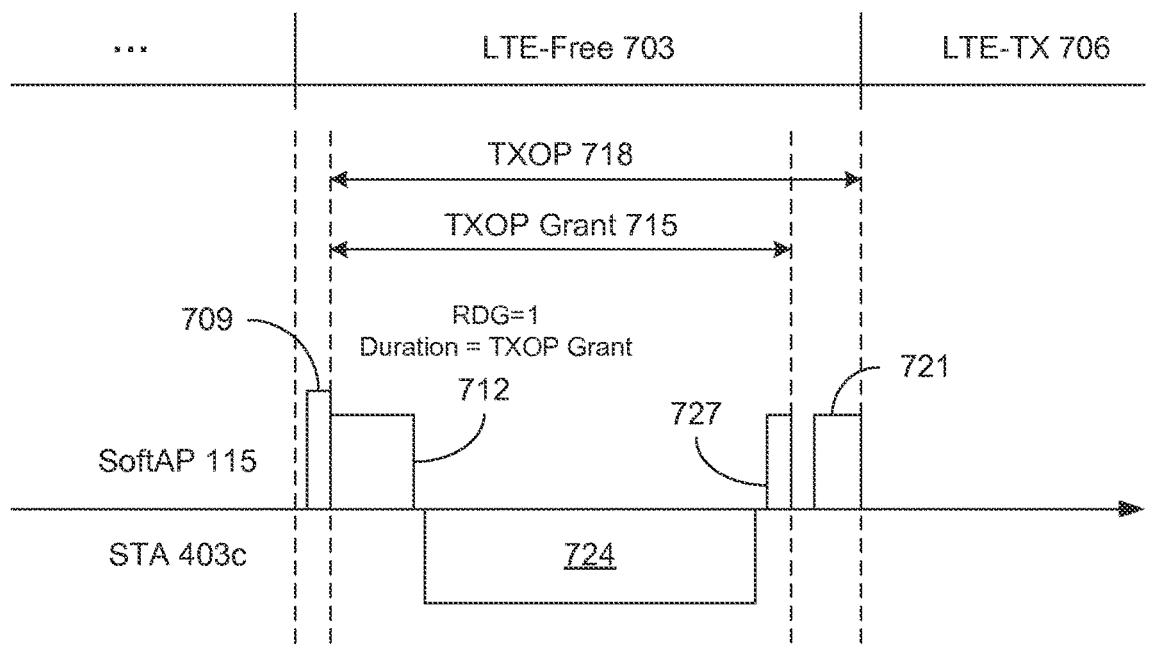

In another implementation, a combination of RDG and CTS2self frames may also be used to prevent a STA transmission from occurring during a transmission period of the coexisting cellular connection as illustrated in FIG. 7. Based upon the LTE communication schedule, the communication interface 103 can determine when a traffic free (LTE-Free) subframe period 703 will occur before a transmission (LTE-TX) subframe period 706 of the LTE communications. At the beginning of the LTE-Free subframe period 703, the SoftAP 115 of the communication device 100 (FIG. 4) obtains contention free access to the WLAN communication channel during a contention phase 709. The SoftAP 115 sends a RDG frame 712 to a STA 403c granting the use of the WLAN channel to the STA 403c for a duration equal to a TXOP Grant 715. The duration can be set such that SoftAP 115 does not have to contend again for sending a CTS2self frame 721 to avoid transmissions during the following LTE-TX subframe period 706 (e.g., TXOP Grant 715=TXOP 718—SIFS—duration of a CTS2self frame 721). The duration is set such that the STA transmission allows for the CTS2self frame 721 to be transmitted at the beginning of the following LTE-TX subframe period 706.

With the grant of RDG frame 712, the STA 403c may then transmit one or more frames 724 for at least a portion of the duration. When the frames 724 have been received from the STA 403c, the SoftAP 115 sends an acknowledgement (ACK) 727 (or BlockACK) confirming receipt. After the ACK 727 is sent in FIG. 7, the SoftAP 115 may send a CTS2self frame 721 in the beginning of the LTE-TX subframe period 706 with the duration field in the MAC header set to the length of the LTE-TX subframe period 706. When the STAs 403 of the WLAN 406 receive the CTS2self frame 721, the STAs 403 update their NAV with the duration specified in CTS2self frame 721 and defer their transmissions until after the duration has passed.

It should be noted that if the STA 403c does not have enough frames 724 to utilize the entire duration, then the SoftAP 115 may grant access to another STA 403 (not shown) for the remaining portion of the TXOP Grant 715 similar to the example of FIG. 5.

In some cases, the SoftAP 115 may not grant the remaining portion of the TXOP Grant 715 to another STA 403 after sending the ACK 727. In this situation, the SoftAP 115 may send the CTS2self frame 721 before the beginning of the LTE-TX subframe period 706 with the duration field set to the length of the LTE-TX subframe period 706 plus the interval between sending the CTS2self frame 721 and the beginning of the LTE-TX subframe period 706. By sending the CTS2self frame 721, the SoftAP 115 makes sure that none of the STAs 403 transmit frames until after the LTE-TX subframe period 706.

Figure 8:
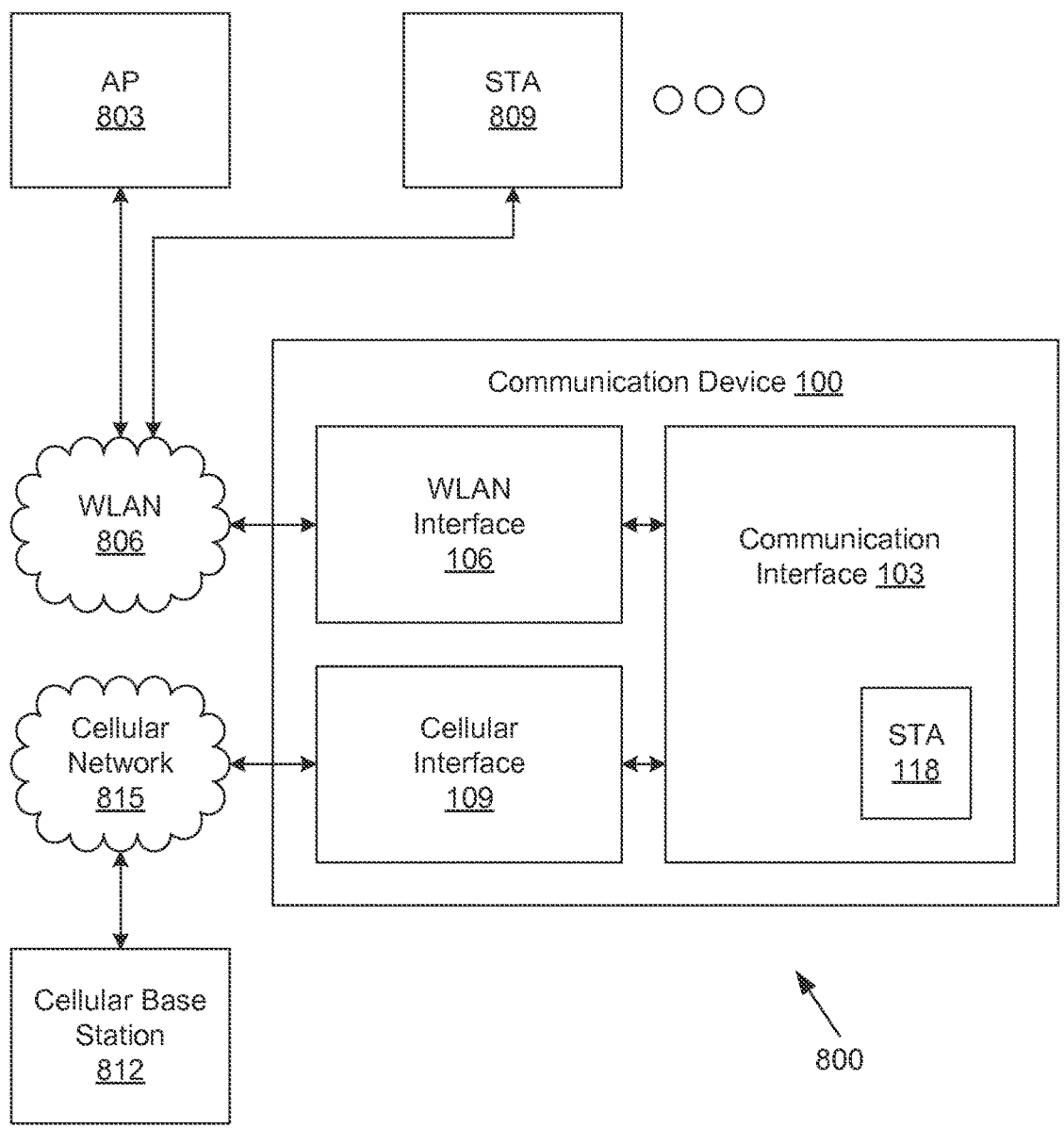
FIG. 8 is an example of a networked environment including a communication device supporting coexisting Wi-Fi and cellular communications in accordance with various embodiments of the present disclosure.

Referring next to FIG. 8, shown is an example of a networked environment 800 including a communication device 100 with coexisting Wi-Fi and cellular communications. In the example of FIG. 8, the communication device 100 is acting as a Wi-Fi client station (STA) 118 communicatively coupled to an access point (AP) 803 (e.g., a wireless AP or SoftAP) through a WLAN 806. One or more other STAs 809 may also be communicatively coupled to the AP 803 through WLAN 806. Each of the STAs 403 may correspond to a handheld device, a mobile device, a desktop computer, a laptop computer, personal digital assistant, cellular telephone, smartphone, set-top box, music player, web pad, tablet computer system, game console, electronic book reader, or other devices with like capability.

The communication device 100 is also communicatively coupled to a cellular base station 812 via cellular network 815. The cellular network 815 may correspond to, e.g., an LTE or WiMAX network. When Wi-Fi transmissions from AP 803 occur during LTE or other cellular transmissions by the communication device 100, the STA 118 may not be able to acknowledge (ACK) the received frames or packets because of mutual interference between the coexisting WLAN and LTE signals. To avoid the effects of mutual interference (e.g., retry, rate drop, and/or packet loss), the communication interface 103 can coordinate WLAN communications so that frames or packets are received by the STAs 403 during an LTE-RX or LTE-Free subframe. RDP and/or CTS2self messaging may again be used for time domain coordination of the coexisting RF signals.

Figure 9:
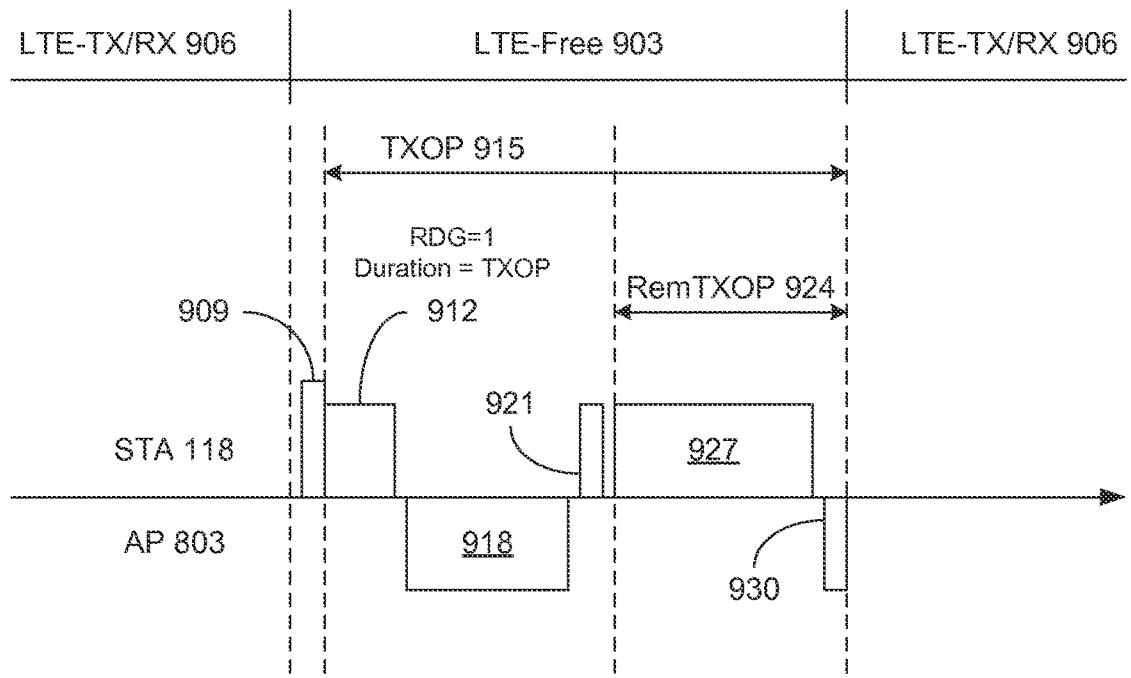
FIGS. 9, 10, 11, and 12 are examples of the coordination of coexistent Wi-Fi and cellular communications by the communication device of FIG. 8 in accordance with various embodiments of the present disclosure.

Referring to FIG. 9, shown is an example of the coordination of coexistent Wi-Fi and cellular communications using a RDG when the communication device 100 is acting as a STA 118 of the WLAN 806 (FIG. 8). When the AP 803 transmits during a transmission period of the cellular interface 109, the STA 118 may not be able to acknowledge the frames because of mutual interference between the RF signals. The STA 118 may not be able to properly decode the frames during the cellular transmission period, causing retry, rate drop, and possible packet loss. To avoid issues with mutual interference, the communication interface 103 can coordinate the coexisting RF communications during a traffic free period of the cellular communications.

In the example of FIG. 9, the communication interface 103 may obtain the communication schedule for an LTE connection to determine that the next traffic free (LTE-Free) subframe period 903 of the LTE communications falls between, e.g., transmitting and/or receiving frames (LTE-TX/RX) 906. At the beginning of the LTE-Free subframe period 903, the STA 118 of the communication device 100 and the AP 803 and other STAs 809 of the WLAN 806 (FIG. 8) attempt to obtain contention free access to the WLAN communication channel during a contention phase 909. Once the contention phase 909 is resolved, the STA 118 may use a RDG 912 to allow the AP 803 to transmit over the WLAN channel for a duration corresponding to at least a portion of a TXOP 915 of the LTE-Free subframe period 503. In the example of FIG. 9, the TXOP 915 extends from the end of the contention phase 909 to the end of the LTE-Free subframe period 903.

The STA 118 sends a RDG frame 912 to AP 803 after obtaining contention free access to grant the use of the WLAN channel to the AP 803 for a duration equal to the TXOP 915 of the LTE-Free subframe period 903. The RDG frame 912 may include a RDG flag that is set to 1 to indicate a reverse direction grant is provided to the AP 803 and/or a duration field in a MAC header specifying the duration during which the AP 803 may transmit. The duration is set such that the AP transmission ends before the next LTE-TX/RX subframe period 906 starts. With the grant of RDG frame 912, the AP 803 may then transmit one or more frames 918 for at least a portion of the duration. When the frames 918 have been received from the AP 803, the STA 118 sends an acknowledgement (ACK) 921 (or BlockACK) confirming receipt. Frames 918 may contain acknowledgement information for RDG frame 912, in addition to any new frames that are being sent from AP 803 to STA 118. If the AP 803 does not have enough frames 918 to utilize the entire duration, then the STA 118 may use the remaining portion of the TXOP 918 (RemTXOP 924) to transmit frames 927 to AP 803. When the frames are received, the AP 803 sends an acknowledgement (ACK) 930 (or BlockACK).

Figure 10:
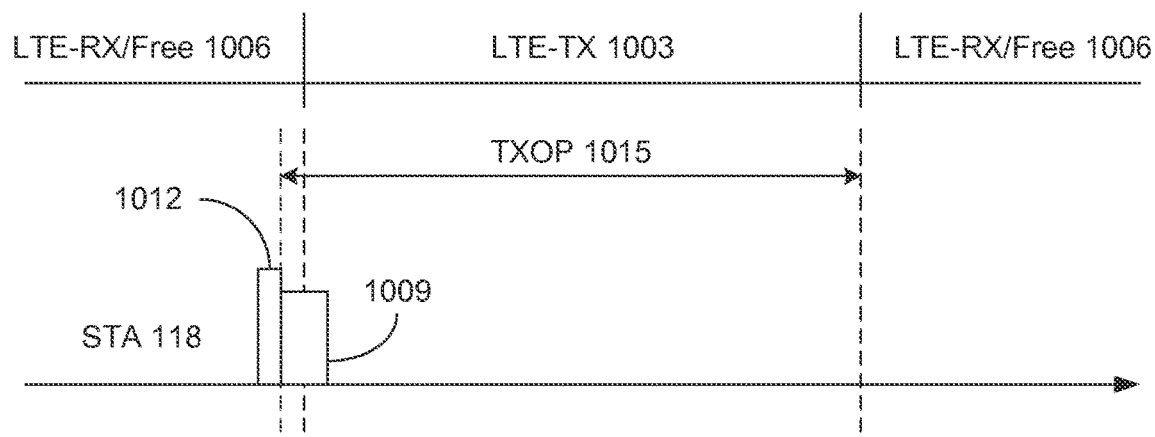

Mutual interference may also be avoided by restricting transmissions of the AP 803 during transmission periods of the cellular interface 109. Referring to FIG. 10, shown is an example of the coordination of coexistent Wi-Fi and cellular communications using a CTS2self frame when the communication device 100 is acting as a STA 118 of the WLAN 806 (FIG. 8). Based upon the LTE communication schedule, the communication interface 103 can determine that the next transmission (LTE-TX) subframe period 1003 of the LTE communications falls between, e.g., receiving and/or traffic free frames (LTE-RX/Free) 1006. To prevent the AP 803 from transmitting during the LTE-TX subframe period 1003, the STA 118 may send a CTS2self frame 1009 after obtaining contention free access of the WLAN channel during contention phase 1012. The CTS2self frame 1009 is sent in the beginning of the LTE-TX subframe period 1003 with a duration field in the MAC header set to the length of the LTE-TX subframe period 1003, which is less than or equal to TXOP 1015. When the AP 803 receives the CTS2self frame 1009, the AP 803 defers its transmissions by the duration specified in CTS2self frame 1009. By sending the CTS2self frame 1009 in the beginning of the LTE-TX subframe period 1003, the STA 118 makes sure that the AP 803 won't transmit frames during the LTE-TX subframe period 1003. In this way, mutual interference between the WLAN and LTE transmissions is avoided, reducing the retry, rate drop, and packet loss that may occur otherwise.

Figure 11:
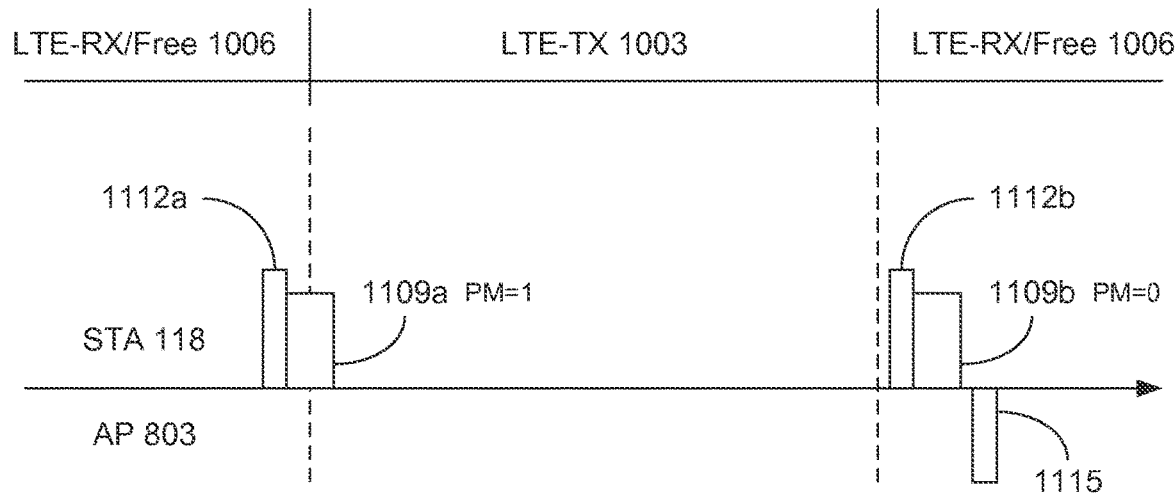

Referring next to FIG. 11, shown is an example of the coordination of coexistent Wi-Fi and cellular communications using a null data frame when the communication device 100 is acting as a STA 118 of the WLAN 806 (FIG. 8). To prevent the AP 803 from transmitting during the LTE-TX subframe period 1003, the STA 118 may send a null data frame 1109*a* after obtaining contention free access of the WLAN channel during contention phase 1112*a*. The null data frame 1109*a* is sent in the beginning of the LTE-TX subframe period 1003 to indicate that the STA 118 is entering a power save mode. For example, the null data frame 1109*a* may include a power mode (PM) bit that when set to "1" indicates the power save mode. When the AP 803 receives the null data frame 1109*a*, AP 803 stops transmitting to the STA 118 and starts buffering the traffic.

Once the LTE-TX subframe period 1003 is over, the STA 118 transmits another null data frame 1109*b* that indicates that the STA 118 is coming out of the power save mode. For example, the PM bit may be set to "0" to indicate that the STA 118 is no longer in the power save mode. In the example of FIG. 11, the null data frame 1109*b* is sent after a contention phase 1112*b* and an ACK 1115 is sent by the AP 803 after receiving the null data frame 1109*b* indicating that the STA 118 is coming out of the power save mode. The AP 803 may then resume transmission of the buffered traffic. By sending the null data frame 1109*a* in the beginning of the LTE-TX subframe period 1003 and the null data frame 1109*b* at the end of the LTE-TX subframe period 1003, the STA 118 makes sure that the AP 803 won't transmit frames during the LTE-TX subframe period 1003. In this way, mutual interference between the WLAN and LTE transmissions is avoided, reducing the retry, rate drop, and packet loss that may occur otherwise.

To improve the chance of obtaining contention free access to the WLAN channel during the contention phase 1112, a null data frame 1109 with a point inter-frame space (PIFS) and a small backoff may be used. For example, instead of using a distributed inter-frame space (DIFS)+VO AC [CW window], PIFS+small random backoff parameters [$CW_{min}$=1, $CW_{max}$=3] may be used. Using the PIFS and the small backoff improves the chance of STA 118 acquiring contention free access for sending the null data frame 1109.

Figure 12:
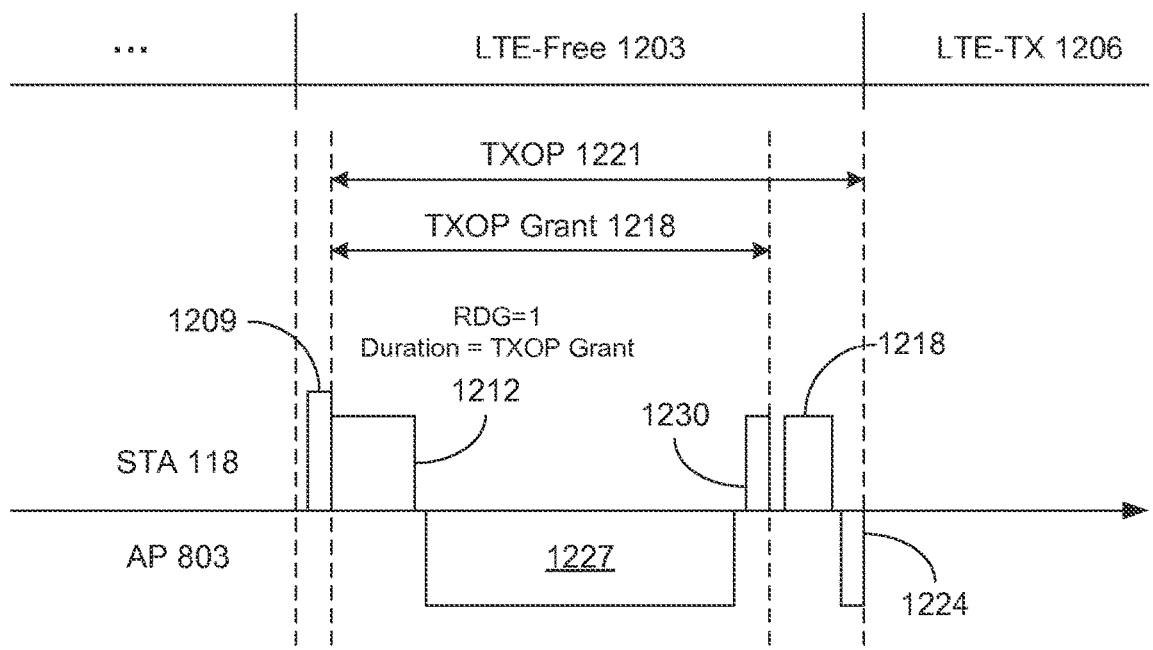

In another implementation, a combination of RDG and null data frames may also be used to prevent an AP transmission from occurring during a transmission period of the coexisting cellular connection as illustrated in FIG. 12. Based upon the LTE communication schedule, the communication interface 103 can determine when a traffic free (LTE-Free) subframe period 1203 will occur before a transmission (LTE-TX) subframe period 1206 of the LTE communications. At the beginning of the LTE-Free subframe period 1203, the STA 118 of the communication device 100 (FIG. 8) obtains contention free access to the WLAN communication channel during a contention phase 1209. The STA 118 sends a RDG frame 1212 to the AP 803 (FIG. 8) granting the use of the WLAN channel to the AP 803 for a duration equal to a TXOP Grant 1215. The duration can be set such that STA 118 does not have to contend again for sending a null data frame 1218 to avoid transmissions during the following LTE-TX subframe period 1206 (e.g., TXOP Grant 1215=TXOP 1221−SIFS−duration of a null data frame 1218−duration of an ACK frame 1224). The duration is set such that the STA transmission allows for the null data frame 1218 and ACK 1224 to be transmitted at the beginning of the following LTE-TX subframe period 1206.

With the grant of RDG frame 1212, the AP 803 may then transmit one or more frames 1227 for at least a portion of the duration. When the frames 1227 have been received from the STA 118, the STA 118 sends an acknowledgement (ACK) 1230 (or BlockACK) confirming receipt. After the ACK 1230 is sent in FIG. 12, the STA 118 may send a null data frame 1218 to indicate that the STA 118 is entering a power save mode (e.g., PM=1). An ACK 1224 is sent by the AP 803 after receiving the null data frame 1218 and AP 803 stops transmitting to the STA 118 and starts buffering the traffic. Once the LTE-TX subframe period 1206 is over, the STA 118 can transmit another null data frame (not shown) that indicates that the STA 118 is coming out of the power save mode (e.g., PM=0). The AP 803 may then resume transmission of the buffered traffic.

In some situations, concurrent WLAN and cellular transmissions may occur when the communication device 100 is acting as a SoftAP 115 to a STA 403 as in FIG. 4 or as a STA 118 in communication with an AP 803 as in FIG. 8. When an acknowledgment (ACK) to the WLAN transmission is sent during the cellular transmission, then the ACK may not be decoded properly which can result in retry, rated drop, and/or packet loss. By coordinating the WLAN communications such that the ACK is sent during a receive period or traffic free period that follows the cellular transmission period, interference between the WLAN and cellular transmissions may be avoided.

Figure 13:
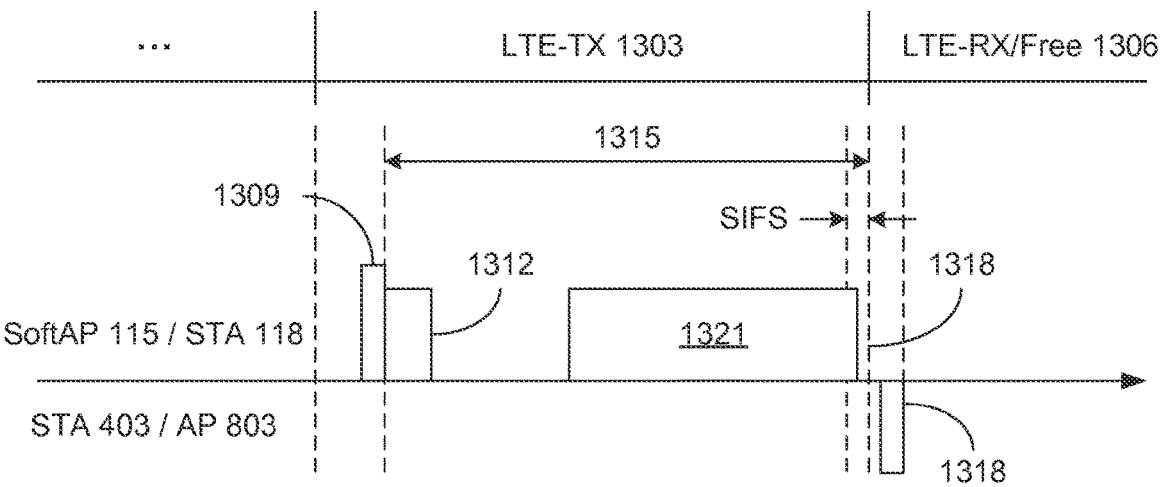
FIGS. 13 and 14 are examples of the coordination of coexistent Wi-Fi and cellular communications by the communication device of FIGS. 4 and 8 in accordance with various embodiments of the present disclosure.

Referring to FIG. 13, shown is an example of the coordination of coexistent Wi-Fi and cellular communications using a CTS2self frame when the communication device 100 is acting as a SoftAP 115 or a STA 118. In the example of FIG. 13, the communication device 100 may transmit, e.g., MAC protocol data units (MPDUs) and/or aggregated MPDUs (AMPDU) over a WLAN channel during an LTE transmission (LTE-TX) subframe period 1303. To improve the success of the WLAN transmission, the transmitted data may be aligned within the LTE-TX subframe period 1303 such that the ACK is sent during the following receive or traffic free (LTE-RX/Free) subframe period 1306. In the example of FIG. 13, the SoftAP 115 or STA 118 obtains contention free access of the WLAN channel during a contention phase 1309.

After obtaining access, the SoftAP 115 or STA 118 may send a CTS2self frame 1312 with a duration field in the MAC header set to the length of the remaining LTE-TX period 1315+SIFS+duration of an ACK frame 1318. By sending the CTS2self frame 1312, the SoftAP 115 makes sure that the other STAs 403 (FIG. 4) won't transmit for the specified duration. Similarly, by sending the CTS2self frame 1312, the STA 118 makes sure that the AP 803 (FIG. 8) won't transmit for the specified duration. Based upon the number of MPDUs that are buffered for transmission and the modulation and coding scheme (MCS) rate, the number of MPDUs that may be transmitted within the specified duration can be determined. If multiple MPDUs may be transmitted, an AMPDU (including delimiter) may be formed for transmission. As shown in FIG. 12, transmission of the MPDU or AMPDU 1321 is started by the SoftAP 115 or STA 118 such that it ends within a SIFS period of the boundary 1324 between LTE-TX subframe 1303 and LTE-RX/Free subframe 1306. In this way, the ACK 1318 (or BlockACK) is received during the following LTE-RX/Free subframe period 1306.

Figure 14:
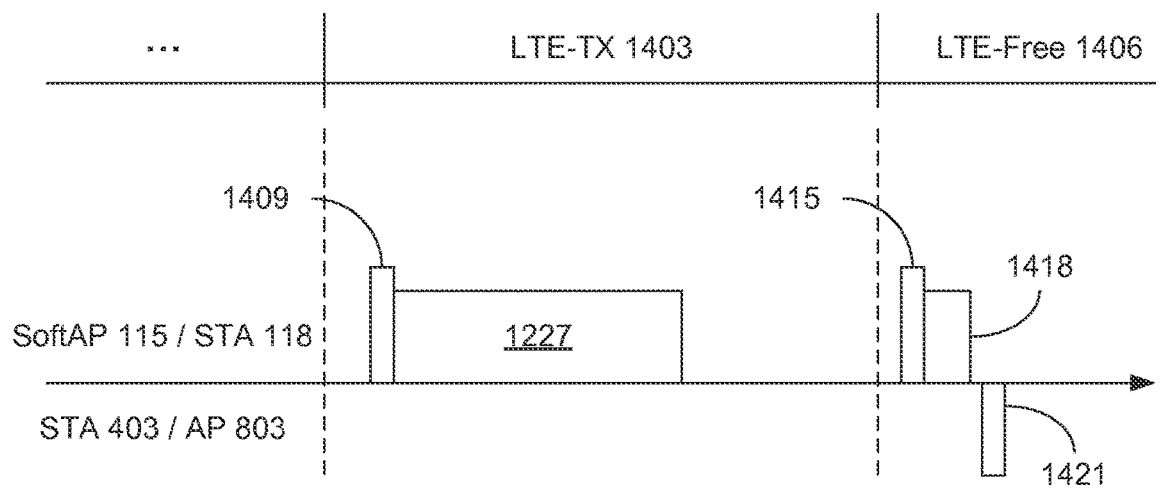

Referring next to FIG. 14, shown is another example of the coordination of coexistent Wi-Fi and cellular communications using an acknowledgement policy when the communication device 100 is acting as a SoftAP 115 or a STA 118. In the example of FIG. 14, an acknowledgement request is used to delay the transmission of the BlockACK (or ACK) until after the LTE-TX subframe period 1403. After obtaining contention free access of the WLAN channel during a contention phase 1409, the SoftAP 115 or STA 118 may send a MPDU or AMPDU 1412 at any time during the LTE-TX subframe period 1403. With the acknowledgement policy, an ACK (or BlockACK) is not expected to be sent until requested by the SoftAP 115 or STA 118. As shown in FIG. 14, the SoftAP 115 or STA 118 sends an ACK request 1418 (or BlockACK request) after a contention phase 1415. In response, the STA 403 or AP 803 sends the ACK 1421 (or BlockACK) during the LTE-Free subframe period 1406 to confirm receipt of the MPDU or AMPDU 1412 during the LTE-TX subframe period 1403. In this way, interference of the ACK 1421 is avoided.

Figure 15A:
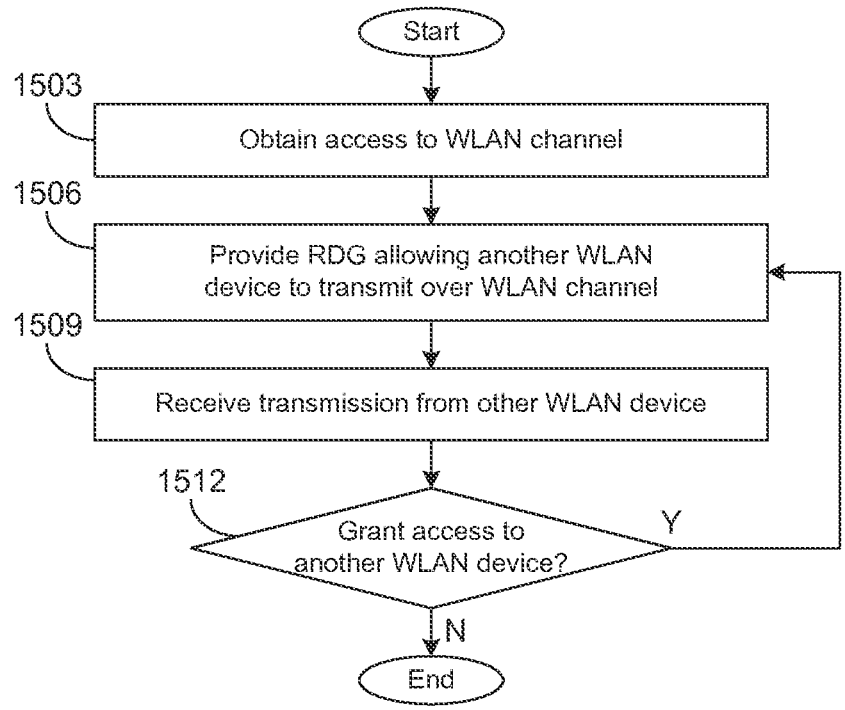
FIGS. 15A and 15B are flowcharts providing examples of coordination of coexisting Wi-Fi and cellular communications in accordance with various embodiments of the present disclosure.
Figure 15B:
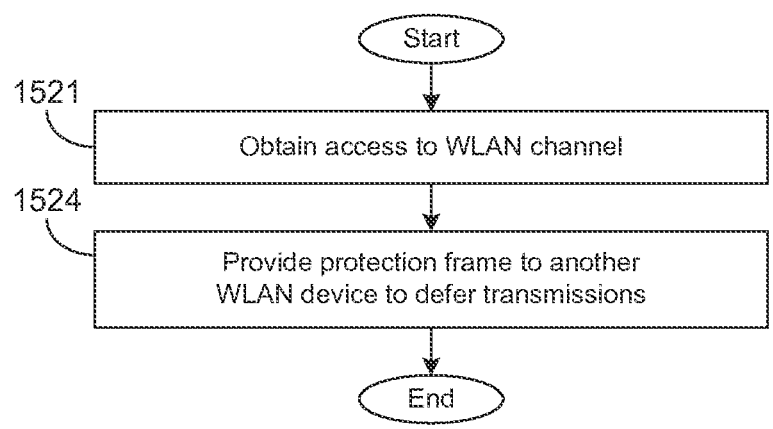

Referring next to FIGS. 15A and 15B, shown are flowcharts that provide examples of coordination of coexisting WLAN and cellular communications in accordance with various embodiments of the present disclosure. It is understood that the flowcharts of FIGS. 15A and 15B provide merely examples of the many different arrangements that may be employed for coexisting WLAN and cellular communications as described herein. As an alternative, the flowcharts of FIGS. 15A and 15B may be viewed as depicting examples of steps of methods implemented in the communication device 100 (FIGS. 4 and 8) according to one or more embodiments.

Referring now to FIG. 15A, beginning with 1503 access to a WLAN channel may be obtained by a communication device 100 supporting coexisting wireless local area network (WLAN) and cellular communications. The access to the WLAN channel is contention free access during a traffic free period of the coexisting cellular connection. A reverse direction grant (RDG) is provided but the communication device 100 to another device of the WLAN in 1506 allowing the other device to transmit over the WLAN channel for a duration corresponding to at least a portion of a transmit opportunity (TXOP) of the traffic free period of the coexisting cellular connection. In 1509, the transmission from the other WLAN device is received. After reception of the transmission, if a portion of the TXOP was not utilized, then the communication device 100 may grant access to the WLAN channel to another WLAN device in 1512. The flow would then return to 1506, where another RDG is provided to allow the transmission. In other implementations, the communication device 100 may not grant access to another WLAN device 1512. In that case, the communication device 100 may utilize access to the WLAN channel for its own transmissions.

Referring to FIG. 15B, beginning with 1521 access to a WLAN channel may be obtained by a communication device 100 supporting coexisting wireless local area network (WLAN) and cellular communications. The access to the WLAN channel is contention free access during a transmission period of a coexisting cellular connection. After obtaining access, a protection frame is provided to at least one other device of the WLAN to defer transmissions for a duration corresponding to at least a portion of a transmit opportunity (TXOP) of the transmission period of the coexisting cellular connection. In some embodiments, the protection frame may be a CTS2self frame transmitted at the beginning of the transmission period that indicates a duration corresponding to the TXOP of the transmission period. In other embodiments, the protection frame may be a null data frame indicating that the communication device 100 is entering a power save mode. A subsequent null data frame may be sent to indicate when the communication device is exiting the power save mode.

Figure 16:
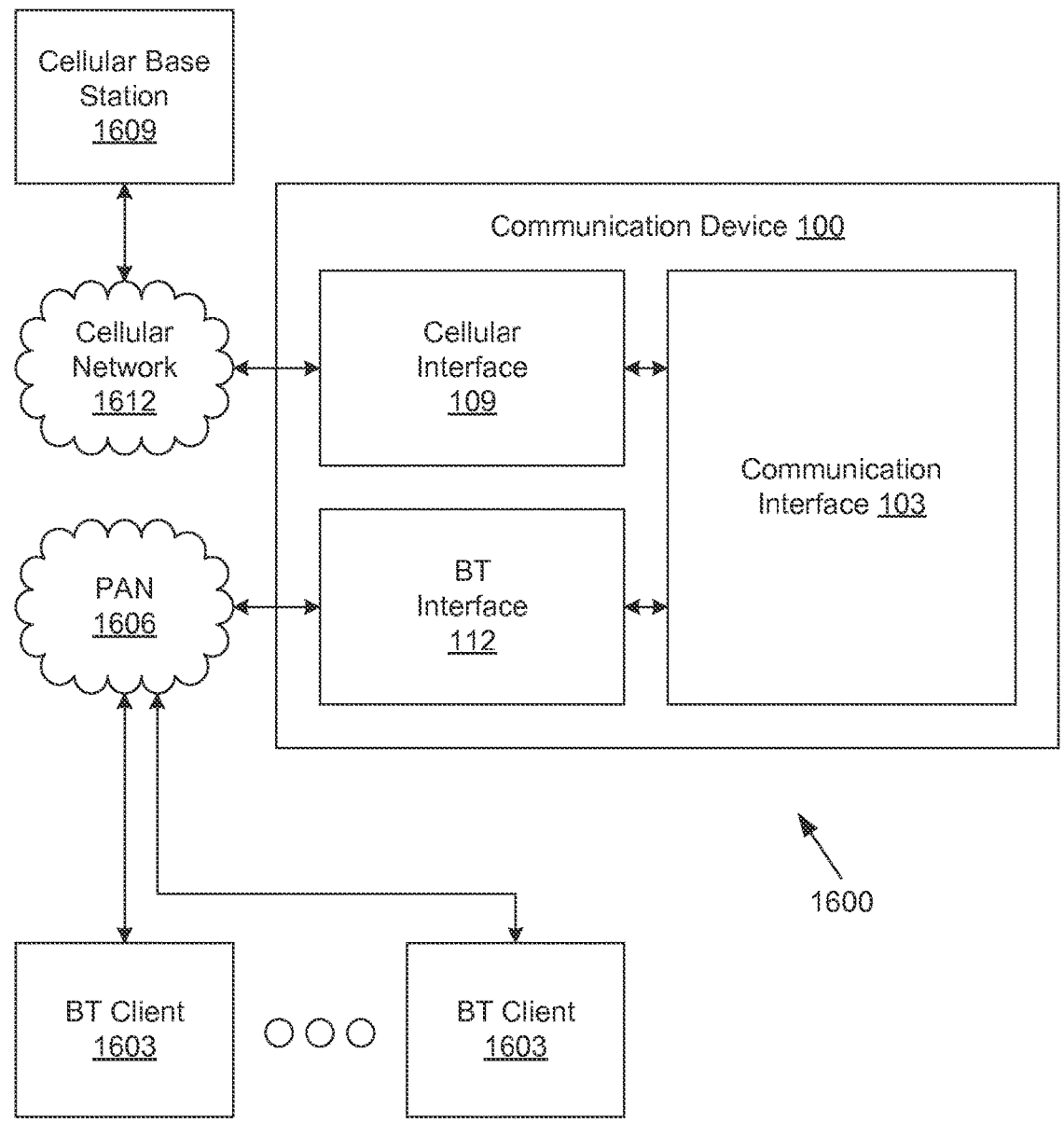
FIG. 16 is an example of a networked environment including a communication device supporting coexisting Bluetooth and cellular communications in accordance with various embodiments of the present disclosure.

Referring next to FIG. 16, shown is an example of a networked environment 1600 including a communication device 100 with coexisting Bluetooth (BT) or BT low energy (BTLE) and cellular communications. In the example of FIG. 16, the communication device 100 is communicatively coupled to one or more BT client(s) 1603 via a personal area network (PAN) 1606 such as a piconet. Each of the BT client(s) 1603 may correspond to a handheld device, a mobile device, a desktop computer, a laptop computer, personal digital assistant, cellular telephone, smartphone, set-top box, music player, headset, or other devices with like capability. The communication device 100 is also communicatively coupled to a cellular base station 1609 via cellular network 1612. The cellular network 1612 may correspond to, e.g., an LTE or WiMAX network. For example, the cellular base station 409 may provide connectivity to the Internet and/or another network for the communication device 100.

By knowing the communication schedule of the cellular interface 109, the communication interface 103 can use this knowledge to schedule BT and/or BTLE traffic to meet less interference and have better throughput. For example, a published LTE communication schedule may be communicated by the cellular interface 109 implementing the LTE connection or a predictor map may be generated based upon TX and RX indications from the cellular interface 109. BT communications are carried out over a channel that is time divided with a slot granularity of 0.625 ms where a master transmits during odd slots and a slave transmits during even slots. Each BT packet can occupy one, three or five slots. The BT interface 112 of the communication device 100 may transmit BT or BTLE traffic during an LTE-TX (or uplink) subframe period or may receive BT or BTLE traffic during an LTE-RX (or downlink) subframe period to avoid mutual interference. Since the extended synchronous connection oriented (eSCO) link is a periodic traffic and the LTE frame is 10 ms, there is a duration (or pattern periodicity) after which positioning of the BT or BTLE traffic with respect to the LTE frame would repeat. By determining the scheduling pattern of the BT or BTLE traffic for the duration of the pattern periodicity, the entire duration of the BT/BTLE and LTE coexistence may be coordinated.

Figure 17:
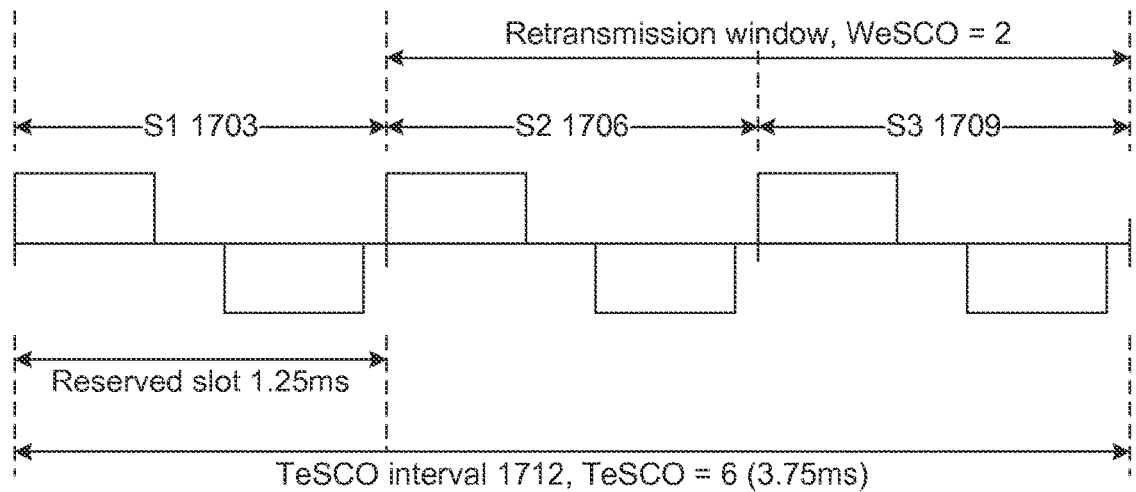
FIG. 17 is a graphical representation of an example illustrating the relationship between TeSCO and WeSCO in a Bluetooth eSCO pattern in accordance with various embodiments of the present disclosure.

BT eSCO comes with a strict requirement of having one RX-TX transaction per TeSCO interval. WeSCO defines the number of retransmissions that may be allowed. FIG. 17 shows an example illustrating the relationship between TeSCO and WeSCO. In the example of FIG. 17, TeSCO=6 (with an interval of 3*1.25 ms), WeSCO=2 and the packet type is EV3. The S1 transaction window 1703 has a 1.25 ms duration and starts with an offset of zero, the S2 window 1706 starts with an offset of 1.25 ms, the S3 window 1709 starts with an offset of 2.5 ms, and each of S1 1703, S2 1706 and S3 1709 are 1.25 ms in duration with a RX slot and a TX slot. For A2DP/ACL, S1, S2, S3 convention is used to indicate consecutive 1.25 ms of Tx-Rx pair slots. BT SCO HV3 packets are only allowed transmission at S1 1703. But in a coexistence scenario or with high interference, retransmissions may be needed to compensate for failures during the S1 window 1703. An eSCO packet type supports retransmission. If the transaction at S1 1703 fails, the transaction is tried again at S2 1706; and if that fails as well then it is tried again at S3 1709. By selecting the window (S1/S2/S3) such that the first transaction in an eSCO window goes out error-free, a reduction in power consumption by the transmitter and a reduction of interference with LTE communications can be achieved.

Figure 18A:
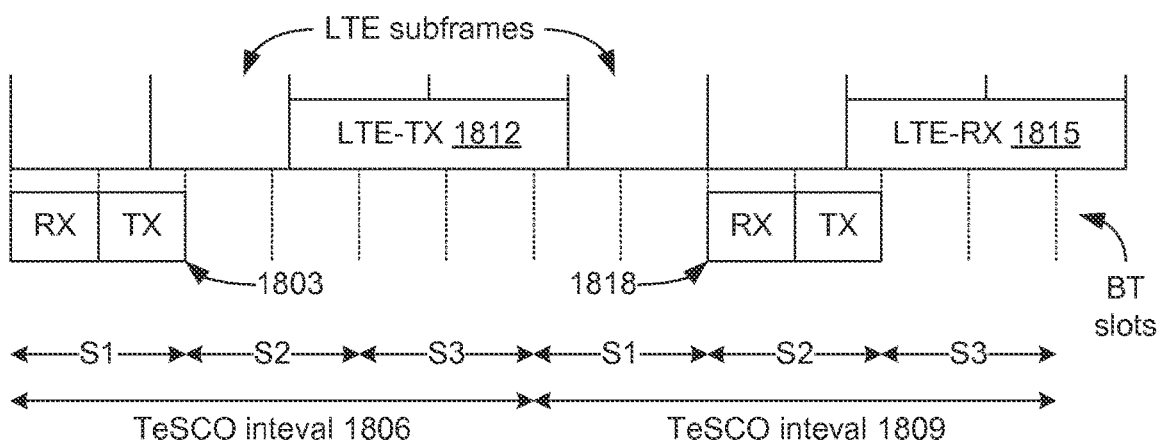
FIGS. 18A, 18B, 19A, and 19B are examples of the coordination of coexistent Bluetooth and cellular communications by the communication device of FIG. 16 in accordance with various embodiments of the present disclosure.

Bluetooth eSCO packets are sent out in every TeSCO interval, which are negotiated during the eSCO connection setup. For every TeSCO interval in the pattern periodicity, the BT might not get any of the S1, S2, or S3 transaction windows because of the coexistent LTE communications. FIG. 18A illustrates an example of a conflict between BT communications and LTE communications with the communication device 100 supporting BT communications as, e.g., a slave. The BT RX-TX transaction 1803 can be scheduled in S1 transaction window of the first TeSCO interval 1806 without conflicting with the LTE communications. In the second TeSCO interval 1809, a conflict occurs between the LTE-TX 1812 and the BT RX-TX transaction in the S1 transaction window and between the LTE-RX 1815 and the BT RX-TX transaction 1818 in the S2 and S3 transaction windows. Because of this, BT RX-TX transaction 1818 cannot be scheduled in the S1, S2, or S3 transaction windows of the second TeSCO interval 1809.

Figure 18B:
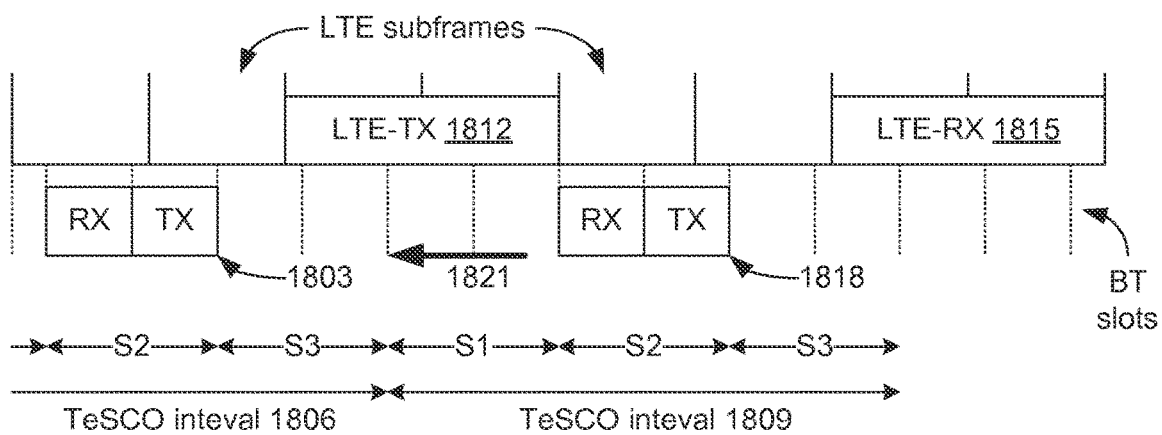

However, by shifting the TeSCO intervals with respect to the start of the LTE frame, the BT RX-TX transactions 1803 and 1818 in the pattern periodicity can be scheduled. The shift can be determined with respect to the LTE transmit and receive pattern of the LTE communication schedule. Referring to FIG. 18B, shown is a BT shift 1821 of the BT RX-TX transaction 1818. By shifting the TeSCO intervals to lead the LTE frame start by 1 ms; the BT RX-TX transaction 1803 can be scheduled in S2 window of the first TeSCO interval 1806 and the BT RX-TX transaction 1818 can be scheduled in S2 window of the second TeSCO interval 1809. By determining a unique BT shift of the TeSCO intervals with respect to LTE frame start, it is possible for all BT RX-TX transactions in the pattern periodicity to go through. Shifting the BT RX-TX transactions can help BT traffic which is periodic in nature.

Figure 19A:
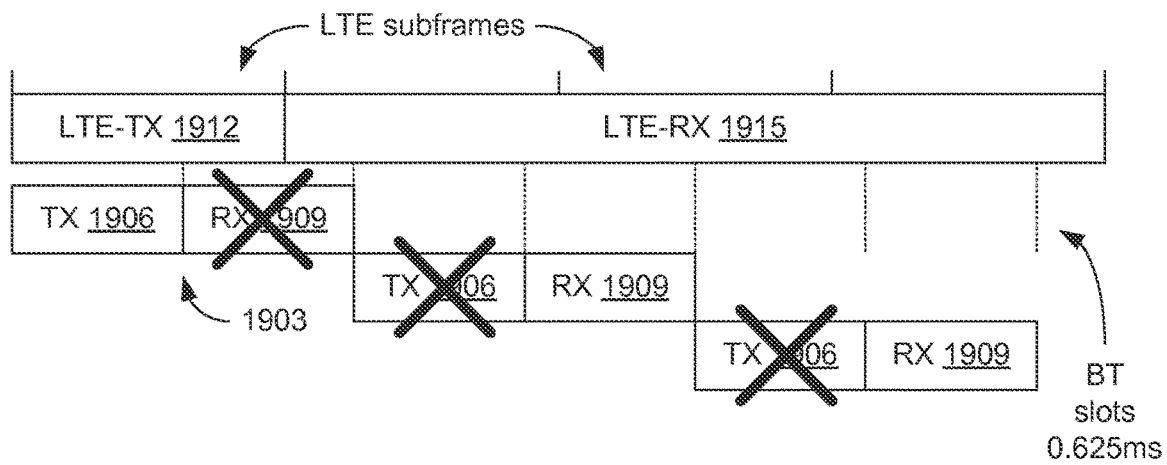
Figure 19B:
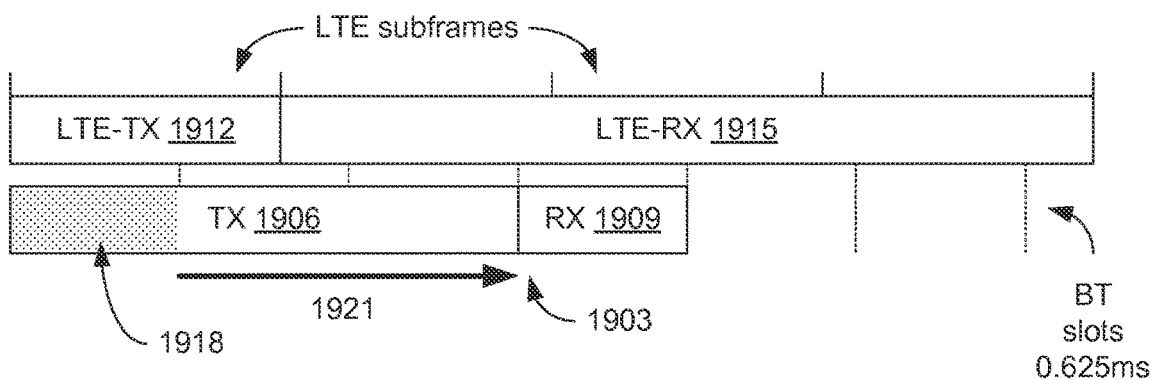

In other implementations, one or both of the RX and/or TX portions of the BT TX-RX transaction may be individually shifted to allow for scheduling. Referring to FIGS. 19A and 19B, BT communications work with a slot granularity of 0.625 ms with the TX-RX transaction 1903 including, e.g., a TX portion 1906 followed by a RX portion 1909 during a transaction window of 1.25 ms. If the communication device 100 is supporting BT communications as, e.g., a master, it would TX at even slots and RX at odd slots. BT client(s) 1603 (FIG. 16) operating as a slave would TX at odd slots. BT packets can be of 1, 3 or 5 slot duration. Referring to FIG. 19A, shown is an example of scheduling of TX-RX transactions 1903 in light of an LTE communication schedule. As shown in the example of FIG. 19A, a LTE-TX subframe period 1912 is followed by three LTE-RX subframe periods 1915. As illustrated in FIG. 19A, the even slot may not be available for BT RX 1909 during the S1 transaction window or odd slots may not be available for BT TX 1906 during the S2 and S3 transaction windows.

As shown in FIG. 19B, the RX portion 1909 may be shifted 1921 to a slot that occurs during the LTE-RX subframe periods 1915 and/or an LTE-Free subframe period. In this way, conflicts between the BT communications and the LTE cellular communications can be avoided. Even with a small payload size that would only occupy one slot for BT TX portion 1906, a packet type may be defined that takes up three or five slots for transmission but with the payload (e.g., 1918 of FIG. 19B) adjusted such that airtime is only for one slot. Even though the packet type is defined to take up three or five slots for transmission, the payload size may be adjusted intelligently to occupy other airtimes such as, e.g., an airtime that coincides with the LTE-TX subframe period 1912. This would offset the start of the BT RX portion 1909 by two or four slots, respectively. The packet type used to affect the desired shift can be based at least in part upon the LTE transmit and receive pattern of the LTE communication schedule. In the example of FIG. 19B, the BT TX packet has been defined for three slots, which shifts 1921 the BT RX portion 1909 over by two slots into LTE-RX subframe periods 1915. The payload 1918 is transmitted during the first slot. The use of non-consecutive slots for the TX-RX transaction 1903 can be beneficial for bursty traffic like ACL (asynchronous connection less). Based on the availability of durations to do either a BT TX portion 1906, a BT RX portion 1909, or both (idle slots), packet types and payload may be defined to allow for an interference-free transaction to be completed.

Figure 20:
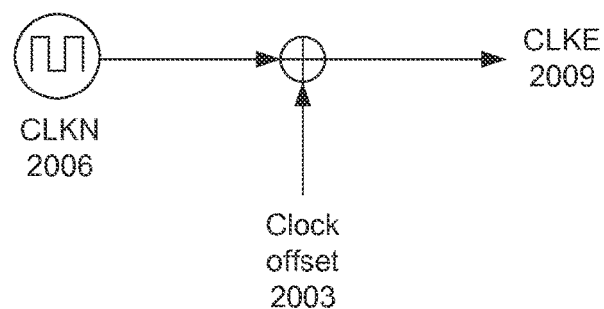
FIG. 20 is a graphical representation of Bluetooth clock estimation in accordance with various embodiments of the present disclosure.

Coexistent cellular communications may also inhibit the establishment of a BT connection between the communication device 100 and another BT client 1603 (FIG. 16) by interfering with the paging sequence. To establish a BT link, a master sends a page message at a number of frequencies about a frequency f(k) at which the slave is predicted to be listening. The train A includes the 16 frequencies surrounding the predicted frequency (i.e., {f(k-8), ... f(k), ..., f(k+7)}) and train B includes the remaining frequencies. In the next slot, a page response is sent by the slave in response to the page message. The master then sends its frequency hopping sequence (FHS) packet to the slave in the next slot informing the slave of the master clock, which is used to determine a clock offset for synchronization of the slave clock. As illustrated in the example of FIG. 20, the clock offset 2003 is added to the output of a free running native clock (CLKN) 2006 to synchronize the estimated clock (CLKE) 2009 with the clock of the master. However, the paging sequence can fail during coexistent cellular transmission by the communication device 100.

For example, when the communication device 100 is operating as a BT master it is possible that the slot used to transmit the page message at the predicted frequency at which the slave is listening occurs during an LTE-TX subframe period. The page message may then fail because of interference between coexisting BT and LTE transmissions. Even if the BT transmission is successful, it is possible that reception of the page response will be unsuccessful due to an LTE transmission. To avoid this situation, the page message at predicted frequency f(k) should be shifted such that it is transmitted, and the page response is received, without interference by an LTE transmission. The communication interface 103 (FIG. 16) finds a slot pattern for transmitting the page message at the predicted frequency f(k) and receiving the page response based at least in part upon the LTE transmit and receive pattern of the LTE communication schedule. By comparing the schedule TX and RX pattern to a period of pattern periodicity with the BT slots, the communication interface 103 can identify a pattern of consecutive BT TX slot, BT RX slot, and BT TX slot that avoids an LTE-TX period or falls within an allowed BT RX period. The index of the identified TX-RX-TX slot pattern may be used to determine an align slot. With reference to FIG. 20, the CLKE 2009 is adjusted by adding the clock offset 2003, which includes the estimated clock offset associated with the master clock plus the estimated TX/RX alignment adjustment of (8–slot alignment)*4, to CLKN 2006. In general, the CLKN 2006 provides two ticks per slot (i.e., a period of 0.3125 ms), so shifting from one TX slot to the next TX slot corresponds to 4 ticks of the CLKN 2006. The clock that is used for master page response generation is also changed from using a frozen clock to using the frozen clock minus the estimated TX/RX alignment adjustment of (8–align slot)*4 ticks.

Figure 21A:
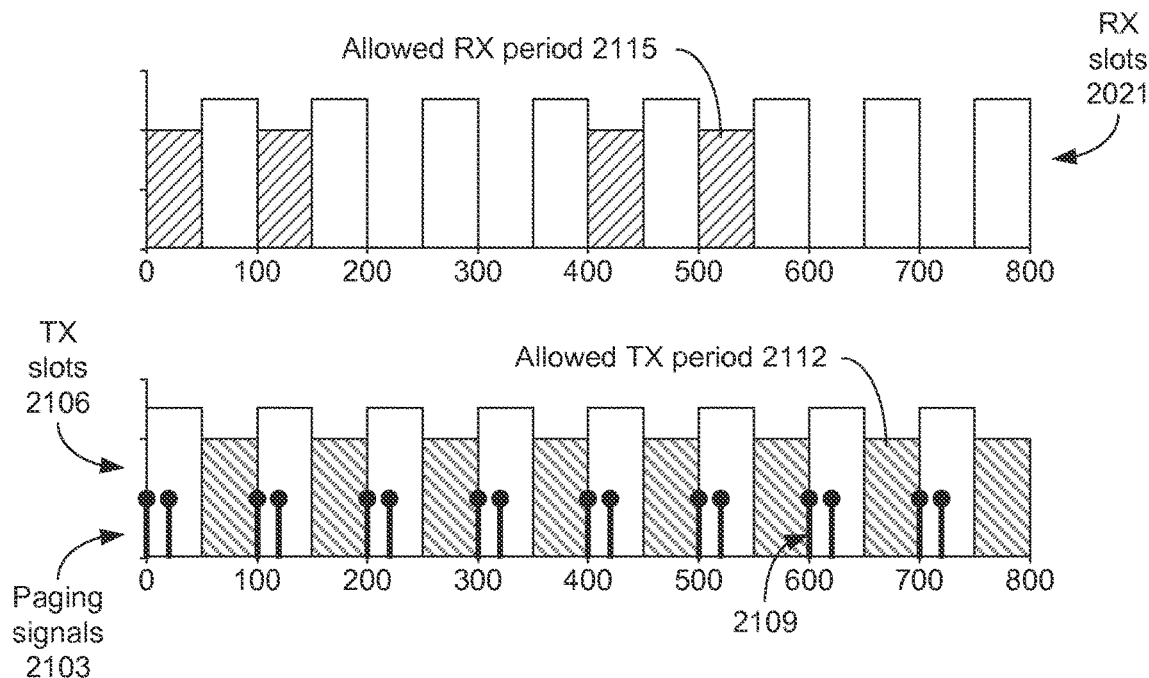
FIGS. 21A and 21B are an example of the coordination of coexistent Bluetooth and cellular communications by the communication device of FIG. 16 in accordance with various embodiments of the present disclosure.
Figure 21B:
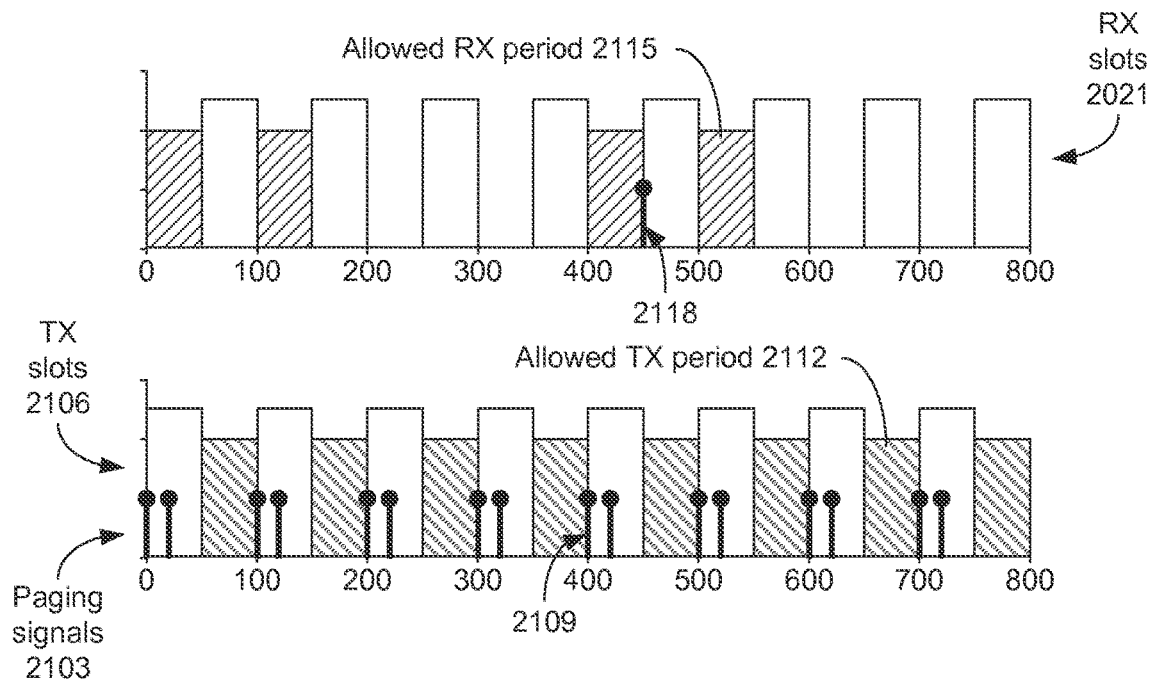

Consider the example of FIGS. 21A and 21B where the communication device 100 is operating as a BT master and a BT client 503 is operating as a slave listening on channel index 14. The BT interface 112 transmits a sequence of the paging messages 2103 during the odd TX slots 2106. In the paging sequence 2103 of FIG. 21A, the page message 2109 at the predicted frequency f(k) is transmitted at channel index 14 (x=600). However, even though page message 2109 may be transmitted to the slave device 503 during the allowed TX period 2112, the BT interface 112 may fail to receive the page response because of coexisting LTE transmissions. However, by adjusting the master clock of the communication device 100 by the estimated TX/RX alignment adjustment, the TX-RX-TX pattern may be aligned with the allowed RX period 2115. As shown in FIG. 21B, by adjusting the master clock by –8 ticks, the page message 2109 at the predicted frequency f(k) is transmitted at x=400. This brings the page response 2118 received in the next RX slot 2121 within the allowed RX period 2115, which allows successful paging. The FHS packet may then be transmitted during the allowed RX period 2115 to avoid possible LTE transmissions.

It should be noted that LTE time division duplex (TDD) configuration has a bias towards an LTE-RX with respect to 5 ms periodicity. In the seven TDD frame configurations of TABLE 1, the first and sixth subframes are always downlink or DL (LTE-RX) as they carry secondary synchronizations signals (SSS) signals. The second subframe is always special or S and the seventh subframe is either special or downlink (LTE-RX). Even if the worst special subframe configuration with respect to uplink or UL (LTE-TX) subframes is considered, which has 0.167 ms for uplink pilot time slot (UpPTS), there is 1.833 ms for downlink (LTE-RX) for every 5 ms. If the communication device 100 allows with WLAN and/or BT transmissions even when LTE is receiving either by use of filters or transmit power control on the WLAN and/or BT side, the LTE TDD frame configuration bias for scheduling the WLAN and/or BT traffic using the 1.833 ms out of every 5 ms.

TABLE 1

| config 0 | DL | S | UL | UL | UL | DL | S  | UL | UL | UL |
| config 1 | DL | S | UL | UL | DL | DL | S  | UL | UL | DL |
| config 2 | DL | S | UL | DL | DL | DL | S  | UL | DL | DL |
| config 3 | DL | S | UL | UL | UL | DL | DL | DL | DL | DL |
| config 4 | DL | S | UL | UL | DL | DL | DL | DL | DL | DL |
| config 5 | DL | S | UL | DL | DL | DL | DL | DL | DL | DL |
| config 6 | DL | S | UL | UL | UL | DL | S  | UL | UL | DL |

Figure 24:
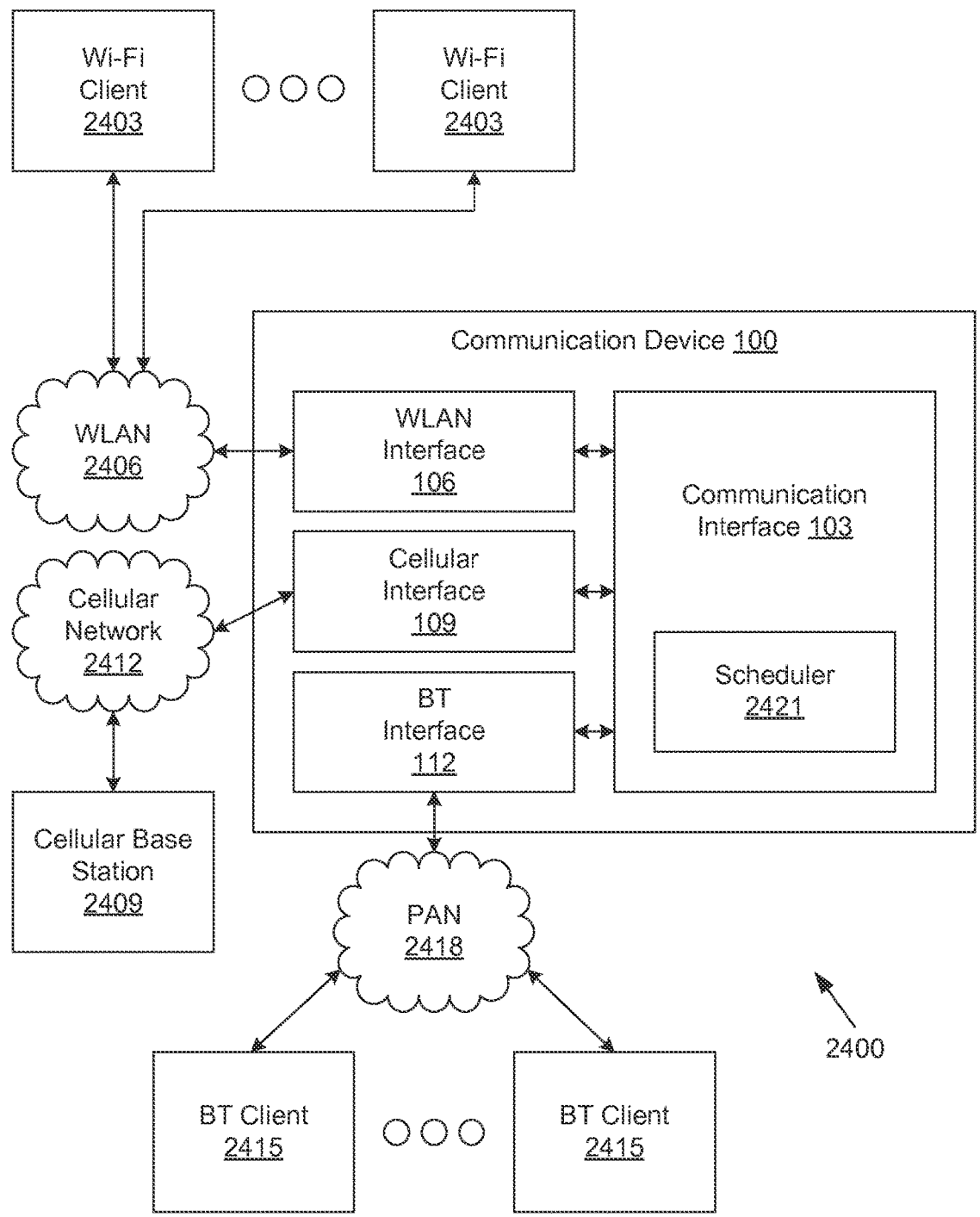
FIG. 24 is an example of a networked environment including a communication device supporting coexisting Wi-Fi, Bluetooth and cellular communications in accordance with various embodiments of the present disclosure.

In general, a standardized scheme for simultaneous transmission and/or reception by two transceivers based upon factors such as the filter on the board, the frequencies of operation, etc. They are referred to as hybrid modes, an example of which is given in TABLE 2. An adaptive hybrid scheme may be used where the hybrid mode is dynamically selected based on the current operating conditions of the communication device 100 (FIG. 24).

TABLE 2

| | WLAN-G/BT TX | WLAN-G/BT RX | Mode | Comment |
|---|---|---|---|---|
| LTE TX | ✓ | ✓ | Hybrid0 | Full simultaneous operation |
| LTE RX | ✓ | ✓ | | |
| LTE TX | ✓ | X | Hybrid1 | No WLAN-G/BT RX with LTE TX |
| LTE RX | ✓ | ✓ | | |
| LTE TX | ✓ | ✓ | Hybrid2 | No WLAN-G/BT TX with LTE RX |
| LTE RX | X | ✓ | | |
| LTE TX | ✓ | X | Hybrid3 | Pure TDM (Only TX-TX and RX-RX) |
| LTE RX | X | ✓ | | |
| LTE TX | ✓ | X | Hybrid4 | Same as Hybrid3 but TX of ACK/ Null data packet is allowed during LTE DL period but not during PDCCH. |
| LTE RX | X | ✓ | | |

In the case of the communication device 100 operating as a BTLE master, the BTLE communications may experience severe interference from coexisting LTE transmissions during uplink and may affect LTE reception during downlink when the BT interface 112 (FIG. 16) is transmitting. The effects can be reduced by allowing the BTLE master to receive during LTE-RX and only transmit during LTE-TX. A BTLE master in hybrid1 mode may also transmit during LTE-RX. FIGS. 22A and 22B illustrate examples of connection setups to schedule BTLE communications. The first packet sent in a connection state by the BTLE master determines the anchor point for the first connection event, and therefore the timings of all future connection events in that connection. The anchor point can be scheduled so that master transmissions coincide with LTE-TX or LTE-FREE if the master is collocated with LTE and coincides with LTE-RX, LTE-RX/FREE, LTE-FREE or the non-uplink period of LTE-SPECIAL if the slave is collocated. A connection request (CONNECT_REQ) 2203 is initiated such that the connection interval (connInterval) 2206 spans an integer number of LTE frames. This may be achieved based upon a communication schedule such as, e.g., the LTE TDD frame configuration schedule or a predictor map.

The communication interface 103 (FIG. 16) can determine a size (transmitWindowSize) 2212 of a transmit window 2215 and a transmit window offset (transmitWindowOffset) 2218. The connInterval 2206 can be chosen so that its size is a multiple of LTE frames. The transmitWindowOffset 2218 and transmitWindowSize 2212 may be adaptively calculated based at least in part upon the communication schedule. The connInterval 2206 may be adaptively aligned with LTE frame. As shown in FIG. 22A, the connInterval 2206 for the BTLE TX-RX-TX operations 2209 may occur after 1.25 ms plus a delay interval (t) 2221 where the delay interval is transmitWindowOffset $2218 \leq t \leq$ transmitWindowOffset 2218+transmitWindowSize 2212. In some cases, the transmitWindowOffset 2218 may be set to zero (0) as illustrated in FIG. 22B. The second connection event anchor point will be the connInterval 2206 after the first connection event anchor point. The BTLE master can close the connection event by setting a more data (MD) bit to zero ("0") when the LTE-RX period is about to end. The allows the BTLE master to avoid interference from subsequent LTE transmissions during the BLTE RX operations even if the MD bit is set to one ("1") by the slave.

Figure 23:
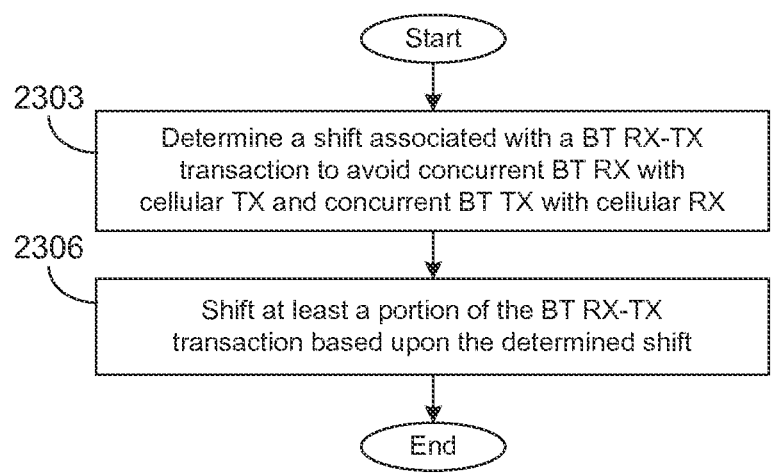
FIG. 23 is a flowchart providing an example of coordination of coexisting Bluetooth and cellular communications in accordance with various embodiments of the present disclosure.

Referring next to FIG. 23, shown is a flowchart that provides an example of coordination of coexisting BT and cellular communications in accordance with various embodiments of the present disclosure. It is understood that the flowchart of FIG. 23 provides merely an example of the many different arrangements that may be employed for coexisting BT and cellular communications as described herein. As an alternative, the flowchart of FIG. 23 may be viewed as depicting an example of steps of a method implemented in the communication device 100 (FIG. 16) according to one or more embodiments.

Beginning with 2303, a shift associated with a BT receive-transmit (RX-TX) transaction is determined by a communication device 100 supporting coexisting BT and cellular communications based at least in part upon a schedule for the cellular communications. The shift avoids concurrent BT RX with cellular TX and concurrent BT TX with cellular RX of the communication device 100. At least a portion of the BT RX-TX transaction is shifted in 2306 based upon the determined shift. In some embodiments, the TeSCO interval corresponding to the BT RX-TX transaction may be shifted by the determined shift to avoid concurrent BT RX with cellular TX and concurrent BT TX with cellular RX. In other embodiments, a TX portion of the BT RX-TX transaction may be shifted by the determined shift to coordinate reception of the TX portion with a TX subframe period of the cellular communications without shifting a RX portion of the BT RX-TX transaction or a RX portion of the BT RX-TX transaction may be shifted by the determined shift to coordinate reception of the RX portion with a RX subframe period of the cellular communications without shifting a TX portion of the BT RX-TX transaction.

Referring to FIG. 24, shown is an example of a networked environment 2400 including a communication device 100 with coexisting Wi-Fi, Bluetooth, and/or cellular communications. In the example of FIG. 24, the communication device 100 may be providing wireless access point services as a SoftAP 115 (FIG. 4) to one or more Wi-Fi clients 2403 operating as a station (STA) or may be acting as a STA 118 (FIG. 8) communicatively coupled to a Wi-Fi client 2403 that is an AP through a WLAN 2406. One or more other Wi-Fi clients 2403 may also be communicatively coupled to the AP through WLAN 2406. The communication device 100 is also communicatively coupled to a cellular base station 2409 via cellular network 2412. The cellular network 2412 may correspond to, e.g., an LTE or WiMAX network. Acting as a SoftAP allows the communication device 100 to facilitate tethering the one or more STAs through the cellular connection to access resources provided by through the cellular network 2412 and base station 2409. In the example of FIG. 24, the communication device 100 is also communicatively coupled to one or more BT client(s) 2415 via a personal area network (PAN) 2418 such as a piconet.

Coordination of the coexisting Wi-Fi (or WLAN), Bluetooth (BT), and/or cellular communications may be handled by the connection interface 103. A scheduler 2421 may be used to evaluate the coexisting communication requests. Cellular traffic (e.g., LTE) is given the maximum priority of the three coexisting communications. BT synchronous and isochronous traffic is next in priority after LTE traffic. BT requests are placed by the scheduler 2421 for evaluation. The LTE transmit and receive pattern (or access pattern) of the LTE communication schedule may be used for placing an access request by the scheduler 2421. WLAN accesses are also coordinated with the LTE transmit and receive pattern of the LTE communication schedule.

Since the BT synchronous connection renders steady state traffic, there is a dependency on the LTE TDD steady state access pattern based at least in part upon the LTE configuration (see, e.g., TABLE 1). Because fitting in the eSCO pattern with the LTE access pattern is different, eSCO is handled separately from ACL links. With the communication device 100 operating as a BT master, the freedom of choosing the eSCO patterns is available. At the start of BT connection establishment, the following input and output parameters are determined for a supported eSCO connection. Input parameters include, e.g., a LTE configuration, a discontinuous reception (DRX) pattern, a semi persistent scheduling (SPS) pattern, and/or LTE frame synchronization information. Output parameters include, e.g., TeSCO, DeSCO, and WeSCO values (standard defined), BT shift (or frame alignment offset), packet type, RX payload bytes/packet, and/or TX payload bytes/packet. LTE TDD configurations have a DL/UL (or LTE-RX/LTE-TX) pattern duration of 10 or 5 ms. As discussed with respect to FIG. 16, a BT TX/RX pattern will have a duration of the TeSCO interval in case of an eSCO connection. For LTE schedules, the BT eSCO combined pattern will repeat after a pattern periodicity. BT shift is the duration in time between the first LTE TDD frame start and the first BT TeSCO interval. The packet type may be used to introduce a shift (or gap) between the TX and RX portions of a BT TX-RX transaction as discussed above. The output parameters may be used to determine the BT access pattern which will have the duration of the pattern periodicity. Other periodic patterns that should be considered are BLE connections and WLAN beacon transmissions.

Figure 25:
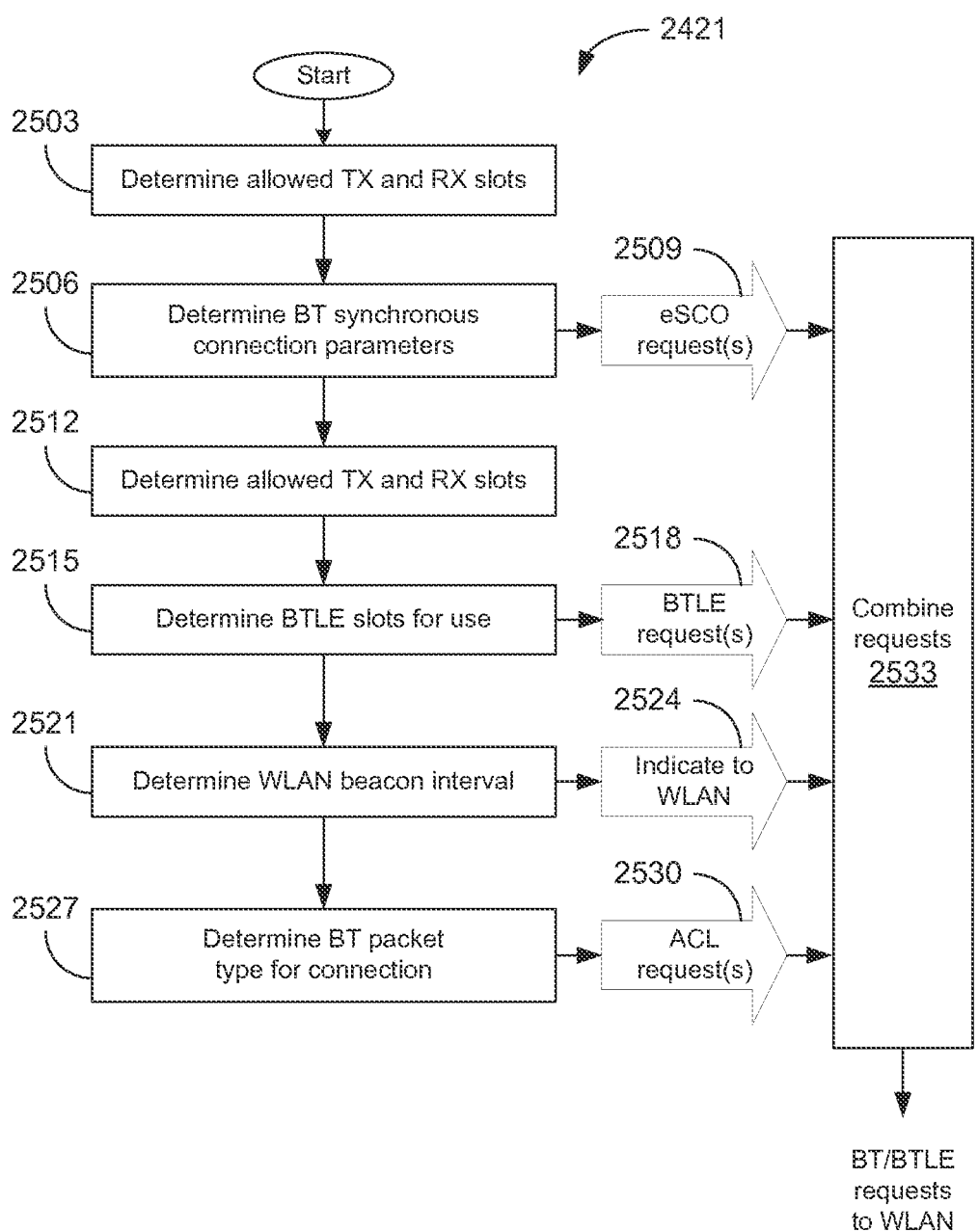
FIG. 25 is a flowchart providing an example of coordination of coexisting Wi-Fi, Bluetooth and cellular communications in accordance with various embodiments of the present disclosure.

Referring next to FIG. 25, shown is a flowchart that provides an example of coordination of coexisting WLAN, BT, and cellular communications by the scheduler 2421 in accordance with various embodiments of the present disclosure. It is understood that the flowchart of FIG. 25 provides merely an example of the many different arrangements that may be employed for coexisting WLAN, BT and cellular communications as described herein. As an alternative, the flowchart of FIG. 25 may be viewed as depicting an example of steps of a method implemented in the communication device 100 (FIG. 24) according to one or more embodiments.

Beginning with 2503, BT slots that are allowed to TX and/or RX are determined by the scheduler 2421. The LTE transmit and receive pattern (or access pattern) of the LTE communication schedule may be obtained from the cellular interface 109 by the communication interface 103 and used by the scheduler 2421 to determine which BT slots are available for TX and/or RX based at least in part upon the access pattern. BT synchronous connection parameters are then determined in 2506 to determine the slot use. For example, TeSCO, DeSCO, and WeSCO values, packet type, RX payload size, and/or TX payload size may be determined to avoid interference with the used slots as previously discussed. Other BT parameters such as, e.g., a BT shift of the TeSCO intervals and/or a BT clock synchronization shift may also be determined. The determinations may be based upon factors such as, e.g., BT connection requirements including TX throughput, RX throughput, maximum latency, and/or packet types supported by the slave and master. Existing reserved slots and/or hybrid modes supported by the communication device 100 may also be considered. The factors may be obtained from the BT interface 112 (FIG. 24) and/or through negotiation with a slave. Based upon the determined synchronous connection parameters, BT eSCO requests may be generated in 2509.

BTLE slots that are allowed to TX and/or RX may then be determined by the scheduler 2421 in 2512 based at least in part upon, e.g., the LTE transmit and receive pattern (or access pattern) and the BT slots being used. The BTLE slots and related parameters are then determined for use in 2515. The determination may be based upon factors such as, e.g., BTLE connections (and/or connection requirements) and/or hybrid modes supported by the communication device 100. BTLE connections can be anchored to free slots in pattern periodicity time interval. The connection interval (e.g., connInterval 2206 of FIGS. 22A and 22B) in case of BTLE can be a multiple of the pattern periodicity. TransmitWindowOffset and transmitWindowSize (e.g., 2218 and 2212 of FIGS. 22A and 22B) should be selected such that the master poll packet falls in the anchor point. Based upon the determined parameters, BTLE requests may be generated in 2518.

The WLAN beacon interval may be determined in 2521 based upon factors such as, e.g., WLAN beacon information and/or hybrid modes supported by the communication device 100. For the WLAN beacon, an extra synchronization between WLAN and BT may be used. When both WLAN and BT are active, WLAN indicates the beacon periodicity. Based upon the indicated beacon periodicity, a slot for WLAN is determined and an indication to WLAN is provided in 2524. This indication avoids a chance of periodic overlap between a BT eSCO slot (or a BTLE slot) and the WLAN beacon. If there is no synchronous connection in BT, then the determination and indication may be bypassed and the WLAN interface 106 can decide on the time by denying a grant in the case of a BT request for a time slot. In other implementations, the WLAN beacon time is not synchronized but a history is maintained of how many beacons are lost. If the number of losses exceeds a predefined limit, then BT eSCO is denied access, which can result in packet loss.

The remaining slots that are allowed to TX and/or RX may be allotted for BT ACL packets. In 2527, the BT packet type is determined for the connection. ACL requests needs to be handled as and when it is required. Based upon the application parameters, a packet type and payload size is selected. The BT asynchronous connection parameters can include, e.g., TX throughput, RX throughput, maximum latency, supported modes and/or hybrid modes supported by the communication device 100. This should be to meet the needed throughput while minimizing the air time. For example, the throughput that can be supported by each packet type supported by the existing TX and/or RX slots can be determined, and the slot with the minimum air time may be chosen. Before generating ACL requests in 2530, the LTE-TX and LTE-RX pattern (or access pattern) is rechecked to determine any modifications based upon the current DRX pattern available through, e.g., common ECI hardware. This may provide additional TX and/or RX opportunities.

The eSCO request(s) 2509, BTLE request(s) 2518, WLAN beacon indication 1514, and/or ACL request(s) 2530 may then be combined in 2533 and sent to the WLAN interface 106. The request to WLAN is placed (e.g., over an ECI interface) a specified time period before the grant is needed and/or issued. The appropriate parameters corresponding to each request are included before the combined request is transmitted.

When there are no requests from BT, the WLAN channel is used based at least in part upon the allowed TX and RX periods (or access pattern) of the LTE communication schedule (or predictor map). WLAN TX/RX control can achieved using protocols such as, e.g., RDG, CTS2self, null data frames with power save modes, blockACK, and/or modified EDCA parameters as previously discussed. In the presence of BT and LTE, the request(s) from BT may be processed as indicated in FIG. 25. The BT request type may also be indicated to determine the priority of the request. The WLAN has the authority to won or disown the request. When operating in a SoftAP 115 mode, the BSS should be setup in a channel of operation that minimizes interference from the LTE communications. By setting appropriate EDCA parameters and broadcasting in the beacon, the SoftAP 118 can maintain access of the WLAN channel. In this way, the SoftAP 118 makes sure that the STAs will not transmit unless given a grant through a RDG. LTE-Free periods may be used to extend the grant period. When operating in a STA 118 mode, the communication device 100 may remain in a sleep (or power save) mode and wake up at appropriate times to retrieve data. As described above, power save modes can be indicated using a null packet with PM bit set. In case of RDG support, there may be control on the end of packet reception. In some embodiments, LTE uplink (UL) duration may be used for TX and LTE downlink (DL) duration will be used for both TX and RX. In case there is no RDG support, transmission from an AP can extend over the UL duration due to excess amount of data or delayed response of AP. This can cause retransmissions and throughput loss can occur.

Figure 26A:
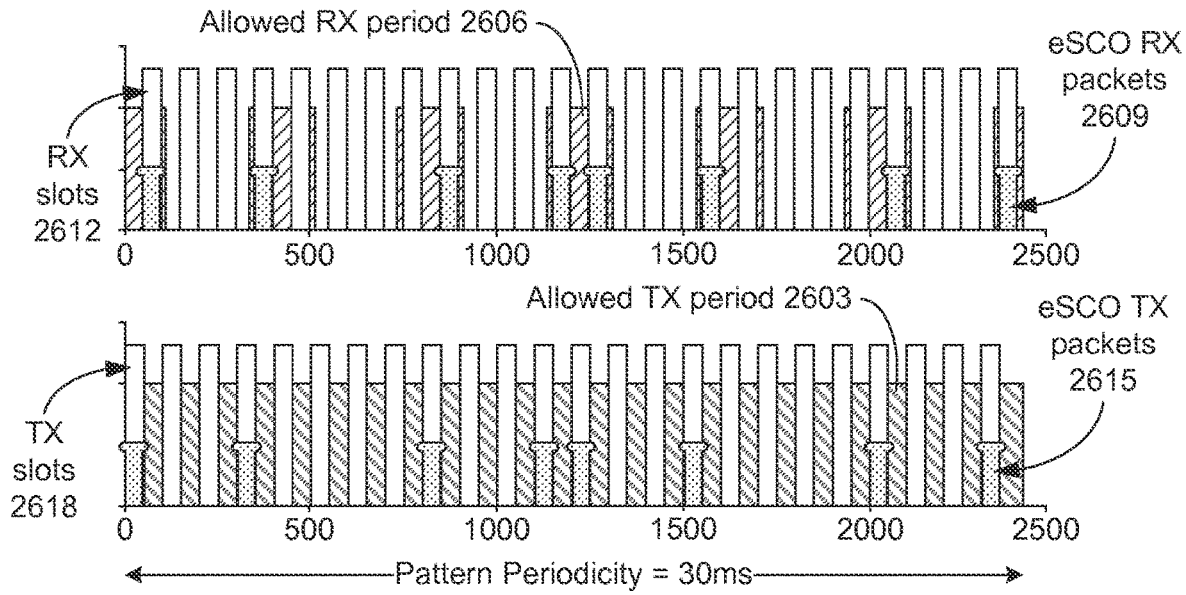
Figure 26B:
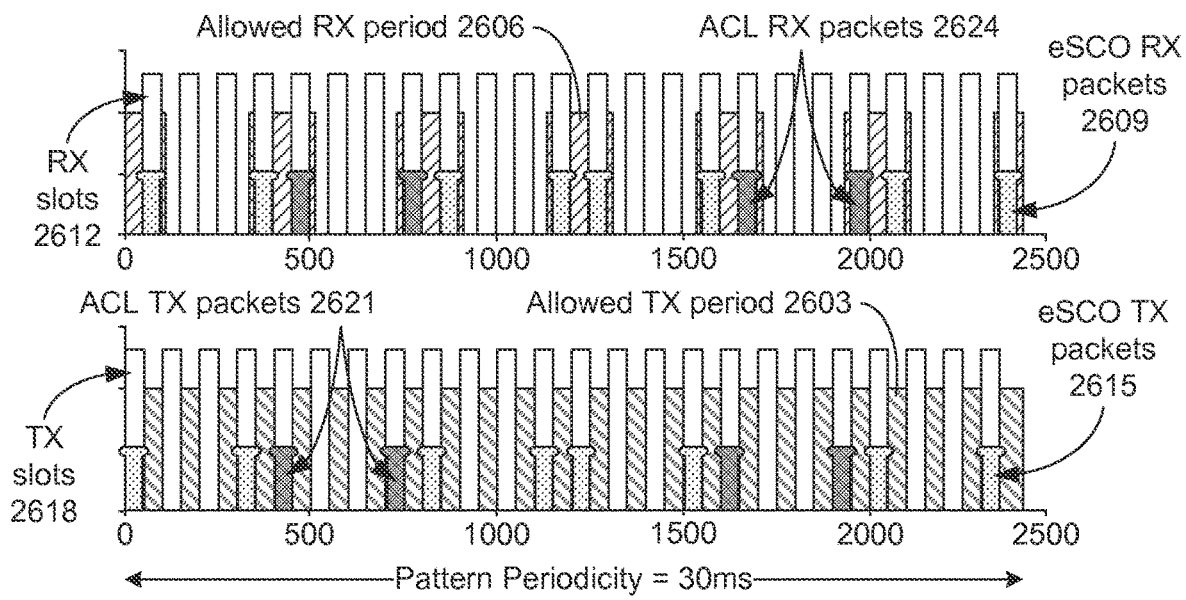

FIGS. 26A through 26F show examples of coordination between various coexisting communications. Referring to FIGS. 26A and 26B, shown is an example with an LTE configuration of config 1 (TABLE 1) in a hybrid1 mode where BT is allowed to transmit at all times (allowed TX period 2603 from LTE) and the BT RX is aligned with the LTE-RX (allowed RX periods 2606 from LTE). The illustrated output of the WLAN eSCO connection is based upon BT connection parameters of a TX throughput of 64 kbps, a RX throughput of 64 kbps, and maximum latency of 8 (slots). The eSCO RX packets 2609 are distributed in the RX slots 2612 that correspond to the allowed RX period 2606. The eSCO TX packets 2615 are distributed in the TX slots 2618. The connection parameters to make this possible may be determined by the scheduler 2421 to be TeSCO=6 (slots) (or 3.75 ms), DeSCO=0, WeSCO=1, TX payload bytes/packet=30 bytes, RX payload bytes/packet=30 bytes, TX packet type=EV3, RX packet type=EV3, and BT shift (between LTE frame start and BT TeSCO interval start)=0.625 ms.

Generally, the eSCO connection will not be alone. For example, in the case of a hands free profile, an ACL channel can be used to control the BT head set parameter(s) such as, e.g., volume. This ACL control channel requires very low throughput. FIG. 26B shows the positioning of ACL TX packets 2621 and ACL RX packets 2624 on top of the eSCO connection. The maximum throughput possible in this case is 18 kbps with an ACL packet type of DM1 in TX and RX direction. Even though FIG. 26B shows the maximum ACL packets 2621 and 2624 that can be accommodated, in actual practice they may not be occupied or utilized. Or it may be possible to have additional packets that can be accommodated based on the current DRX pattern. Hence before forming requests for ACL packets, the scheduler 2421 reexamines the dynamic access patterns that are recently communicated by the cellular interface 109.

Figure 26C:
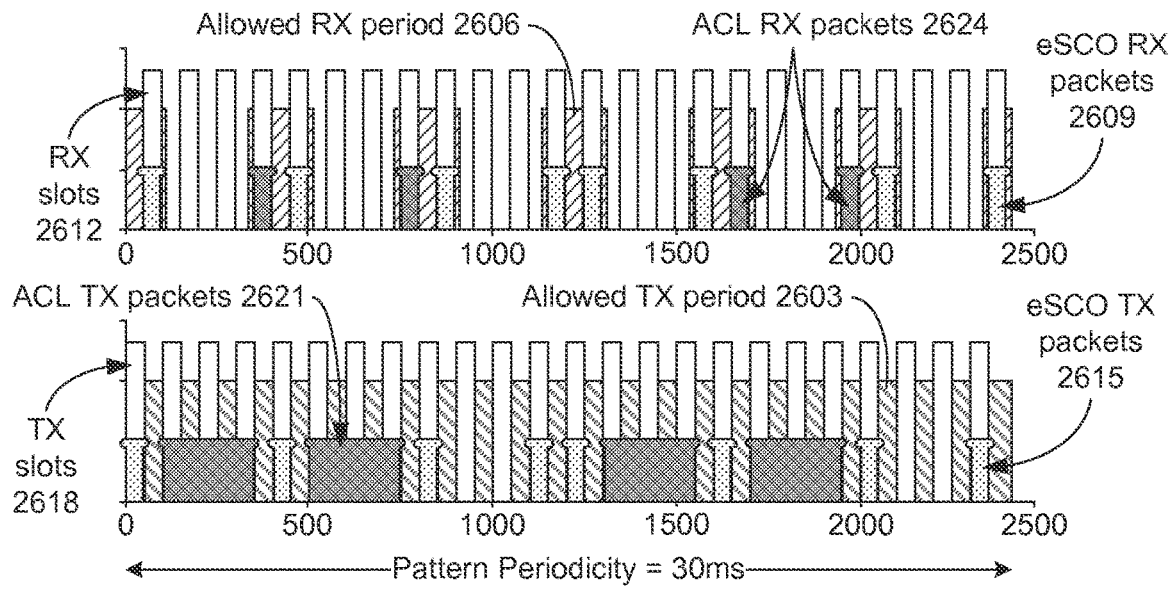
Figure 26D:
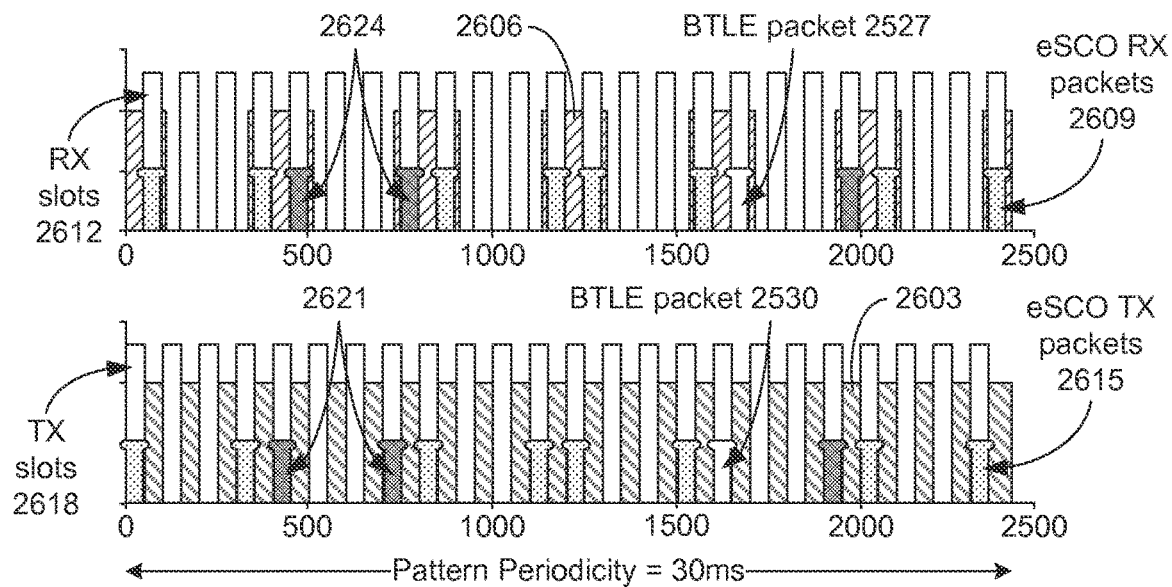

Referring to FIG. 26C, shown is an example where the ACL throughput is asymmetric and in the order of supporting eSCO and an advanced audio distribution profile (A2DP). In the example of FIG. 26C, the connection parameters are TeSCO=6 (slots) (or 3.75 ms), DeSCO=4, WeSCO=2, TX payload bytes/packet=30 bytes, RX payload bytes/packet=30 bytes, TX packet type=EV3, RX packet type=EV3, BT shift (between LTE frame start and BT TeSCO interval start)=0.625 ms, ACL TX packet type=DH5 (max payload) and ACL RX packet type=DM1 (max payload). The maximum throughput possible for the eSCO connection is 64 kbps in the TX and RX directions and for the ACL connection is 361 kbps in the TX direction with the different packet type and 18 kbps in the RX direction. FIG. 26D shows another example of scheduling where a BTLE connection has been incorporated including a BTLE RX packet 2527 and a BTLE TX packet 2530. The anchor points (connection interval) are fixed at a periodicity of a multiple of the pattern periodicity.

Referring next to FIGS. 26E and 26F, shown are examples of BT scheduling with LTE semi persistent scheduling (SPS). For a particular application, the presence of a DRX pattern or SPS relaxes the situation slightly. In the example of FIG. 26E, operation is in a hybrid1 mode (TDM with DRX pattern). Shown is the BT scheduling (ACL TX packets 2621 and ACL RX packets 2624) with SPS for voice once in 20 ms. It can be seen that the eSCO patterns of eSCO RX packets 2609 and eSCO TX packets 2615 are more regular. The maximum throughput possible for the eSCO connection is 64 kbps in the TX and RX directions and for the ACL connection is 341 kbps in the TX direction and 50 kbps in the RX direction. In the example of FIG. 26F, operation is in a hybrid3 mode (TDM with DRX pattern). The maximum throughput possible for the eSCO connection is 64 kbps in the TX and RX directions with EV3 packets and for the ACL connection is 292 kbps with DH3 packets in the TX direction and 27 kbps with DM1 packets in the RX direction. The pattern periodicity will be the least common multiple (LCM) of the SPS period and the BE eSCO periodicity.

In case of SPS, the retransmission may also happen in an asynchronous manner. When retransmission will occur, scheduling returns to the basic scheduling based on the TDD configuration. For BT, this can be done by re configuring the eSCO connections. Once the retransmission has completed, the scheduler 2421 may then switch back to the SPS based scheduling. In this mode, a complicated scheduler is not needed and only BT needs to keep track of the LTE allowed slots. If a slot is not allowed, then it is almost guaranteed that next slot is allowed. In that case, simply hold the TX/RX for the next retransmission slot.

Figure 27:
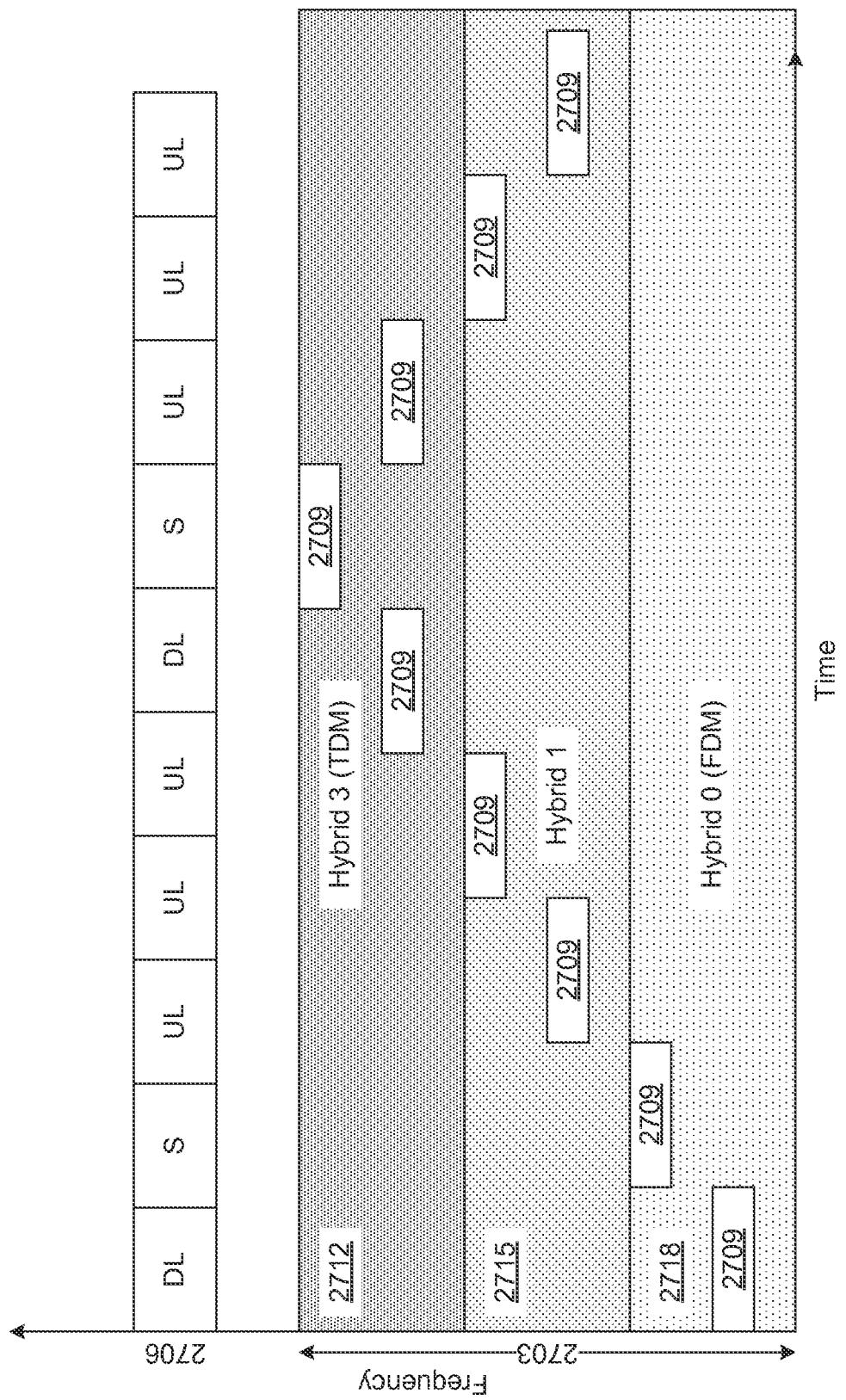
FIG. 27 is an example of adaptively coordinating coexistent Wi-Fi, Bluetooth and cellular communications by the communication device of FIG. 24 in accordance with various embodiments of the present disclosure.

Referring to FIG. 27, shown is an example of coexisting BT and LTE communications. In FIG. 27, BT frequency hopping is carried out over a frequency range 2703 below the operating frequency band 2706 of the LTE communications. BT frequency hops 2709 that are in a predefined band 2712 that is nearest to the LTE frequency band 2706 will operate in hybrid3 mode which is complete TDM, which means that only TX-TX and RX-RX combinations are allowed to coexist. If the BT communications fall in the next band 2715 away from the LTE frequency band 2706, then operation in a hybrid1 mode occurs, which means that BT transmissions are allowed without regard to the LTE access state. The transition boundary between band 2712 and band 2715 may depend upon the filters that are being utilized by the cellular interface 109 (FIG. 24). If the BT communications are at a frequency that is sufficiently far from the LTE frequency band 2706 (e.g., in band 2718), then a hybrid0 mode of operation may be used, where both the cellular interface 109 and the BT interface 112 will operate independently. The information that may be used to decide the transition between hybrid modes of operation may include frequency break points if they are continuous, bit maps corresponding to each hopping point if they are discontinuous, and/or predefined BT channels. The hybrid mode patterns may be determined based upon SNR degradation, jamming effects, VCO coupling and/or VCO pulling issues, and/or intermodulation issues due to simultaneous operations (TX-RX, RX-TX) of the transceivers. The adaptive hybrid scheme may be implemented as part of the scheduler 2421 or another part of the communication interface 103 (FIG. 24).

Figure 28:
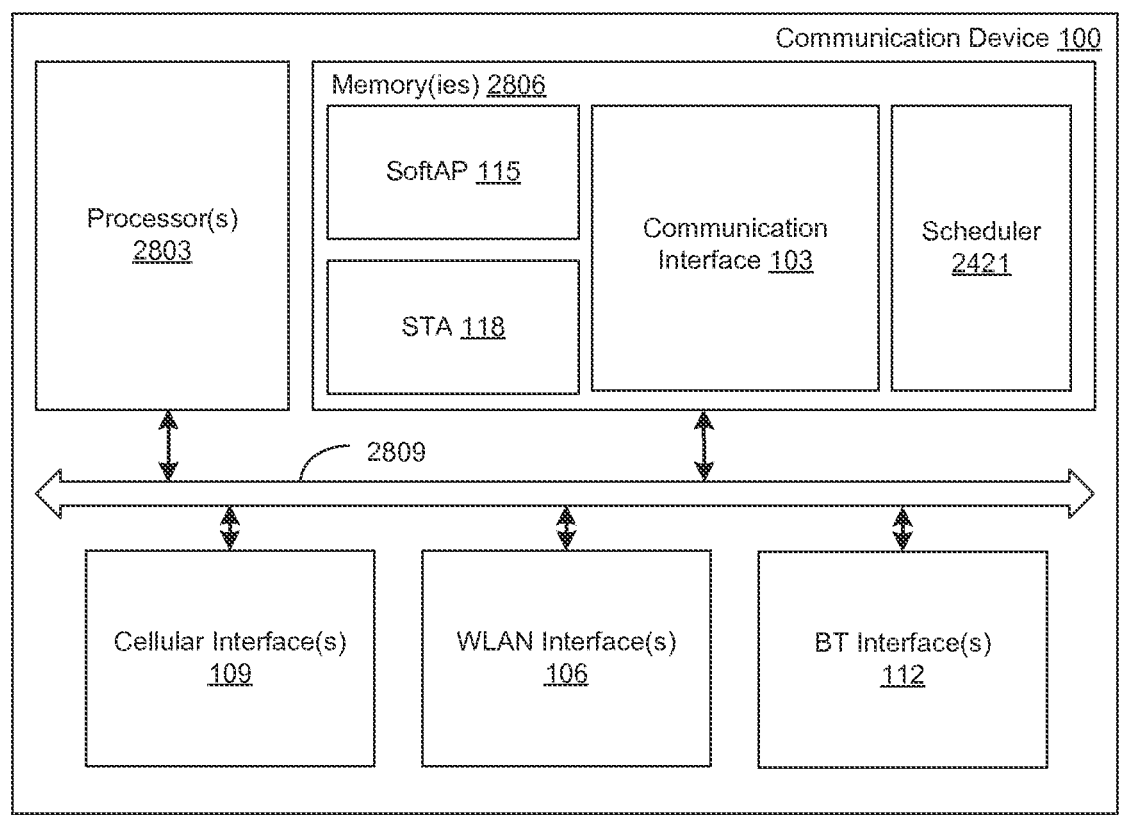
FIG. 28 is a schematic block diagram illustrating an example of the communication device of FIGS. 1, 4, 8, 16, and 24 in accordance with various embodiments of the present disclosure.

With reference to FIG. 28, shown is a schematic block diagram of the communication device 100 in accordance with various embodiments of the present disclosure. The communication device 100 includes at least one processor circuit, for example, having a processor 2803 and a memory 2806, both of which are coupled to a local interface 2809. The communication device 100 may include one or more cellular interface(s) 109, one or more WLAN interface(s) 106, and/or one or more BT interface(s) 112, all of which may be coupled to the local interface 2809. The WLAN interface(s) 106, comprise processing circuitry for supporting Wi-Fi communications such as, e.g., IEEE 802.11 a/b/g/n or other wireless communication protocols. The cellular interface(s) 109 comprise processing circuitry for supporting cellular communications such as, e.g., LTE, WiMAX, WCDMA, HSDPA, or other wireless communication protocols. The BT interface(s) 112 comprise processing circuitry for supporting Bluetooth communications such as, e.g., BT, BTLE, or other wireless communication protocols.

In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions. In some cases, portions of the WLAN interface(s) 106, cellular interface(s) 109, and/or BT interface(s) 112 may be implemented by processor 2803 via local interface 2809. The local interface 2809 may comprise, for example, a data bus with an accompanying address/control bus or other bus structure as can be appreciated.

Stored in the memory 2806 are both data and several components that are executable by the processor 2803. In particular, stored in the memory 2806 and executable by the processor 2803 may be a SoftAP 115, a STA 118, a communication interface 103, a scheduler 2421, and potentially other applications and device interfaces. In some implementations, the communication interface 103 may include the scheduler 2421. In addition, an operating system may be stored in the memory 2806 and executable by the processor 2803. In some cases, the processor 2803 and memory 2806 may be integrated as a system-on-a-chip.

It is understood that there may be other applications that are stored in the memory 2806 and are executable by the processor 2803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 2806 and are executable by the processor 2803. In this respect, the term "executable" means a program file that is in a form that can ultimately be run by the processor 2803. Examples of executable programs may be, for example, a compiled program that can be translated into machine code in a format that can be loaded into a random access portion of the memory 2806 and run by the processor 2803, source code that may be expressed in proper format such as object code that is capable of being loaded into a random access portion of the memory 2806 and executed by the processor 2803, or source code that may be interpreted by another executable program to generate instructions in a random access portion of the memory 2806 to be executed by the processor 2803, etc. An executable program may be stored in any portion or component of the memory 2806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 2806 is defined herein as including both volatile and nonvolatile memory and data storage components. Volatile components are those that do not retain data values upon loss of power. Nonvolatile components are those that retain data upon a loss of power. Thus, the memory 2806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 2803 may represent multiple processors 2803 and the memory 2806 may represent multiple memories 2806 that operate in parallel processing circuits, respectively. In such a case, the local interface 2809 may be an appropriate network that facilitates communication between any two of the multiple processors 2803, between any processor 2803 and any of the memories 2806, or between any two of the memories 2806, etc. The local interface 2809 may comprise additional systems designed to coordinate this communication, including, for example, performing load balancing. The processor 2803 may be of electrical or of some other available construction.

Although the SoftAP 115, STA 118, communication interface 103, scheduler 2421, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 15A, 15B. 23 and 25 show the functionality and operation of an implementation of portions of the communication interface 103 and/or scheduler 2421 and logic implemented by the WLAN interface(s) 106, cellular interface(s) 109, and/or BT interface(s) 112. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 2803 in a computer system or other system. The machine code may be converted from the source code, etc. If embodied in hardware, each block may represent a circuit or a number of interconnected circuits to implement the specified logical function(s).

Although the flowcharts of FIGS. 15A, 15B, 23 and 25 show a specific order of execution, it is understood that the order of execution may differ from that which is depicted. For example, the order of execution of two or more blocks may be scrambled relative to the order shown. Also, two or more blocks shown in succession in FIGS. 15A, 15B, 23 and 25 may be executed concurrently or with partial concurrence. Further, in some embodiments, one or more of the blocks shown in FIGS. 15A, 15B, 23 and 25 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the communication interface 103, scheduler 2421, WLAN interface(s) 106, cellular interface(s) 109, and/or BT interface(s) 112 that comprises software or code can be embodied in any non-transitory computer-readable medium for use by or in connection with an instruction execution system such as, for example, a processor 2803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

What is claimed is:

1. A method, comprising:
   determining, by a communication device supporting coexisting Bluetooth (BT) and cellular communications, a shift associated with a BT receive-transmit (RX-TX) transaction to avoid a concurrent BT RX with a cellular TX and a concurrent BT TX with a cellular RX, the shift based upon a schedule for the cellular communications;
   shifting a portion of the BT RX-TX transaction based upon the determined shift; and
   determining a size of a BT transmit window and a BT transmit window offset adaptively based upon a schedule of a long term evolution (LTE) communication.

2. The method of claim 1, further comprising shifting an interval corresponding to the BT RX-TX transaction by the determined shift to avoid the concurrent BT RX with the cellular TX and the concurrent BT TX with the cellular RX.

3. The method of claim 1, further comprising shifting one or both of a TX and an RX portion of the BT RX-TX transaction by the determined shift to allow for BT communications scheduling.

4. The method of claim 1, further comprising shifting a TX portion of the BT RX-TX transaction by the determined shift to coordinate reception of the TX portion with a TX subframe period of the cellular communications and leaving an RX portion of the BT RX-TX transaction unchanged.

5. The method of claim 1, further comprising shifting an RX portion of the BT RX-TX transaction by the determined shift to coordinate reception of the RX portion with a RX subframe period of the cellular communications and leaving a TX portion of the BT RX-TX transaction unchanged.

6. The method of claim 5, further comprising adjusting a payload of a respective TX packet of the TX portion of the BT RX-TX transaction for an air time of the respective TX packet to be one slot.

7. The method of claim 1, further comprising using the packet type and the packet duration to affect the desired shift of the RX portion of the BT RX-TX transaction based upon a schedule of a long term evolution (LTE) communication.

8. The method of claim 1, further comprising determining a slot pattern for transmitting a BT page message and receiving a page response based upon a schedule of a long term evolution (LTE) communication.

9. A communication device supporting coexisting Bluetooth (BT) and cellular communications, the communication device comprising:
a communication interface configured to determine a shift associated with a BT receive-transmit (RX-TX) transaction to avoid a concurrent BT RX with a cellular TX and a concurrent BT TX with a cellular RX, the shift based upon a schedule for the cellular communications;
a BT interface configured to:
shift a portion of the BT RX-TX transaction based upon the determined shift; and
determine a size of a BT transmit window and a BT transmit window offset adaptively based upon a schedule of a long term evolution (LTE) communication.

10. The communication device of claim 9, wherein the BT interface is configured to shift an interval corresponding to the BT RX-TX transaction by the determined shift to avoid the concurrent BT RX with the cellular TX and the concurrent BT TX with the cellular RX.

11. The communication device of claim 9, wherein the BT interface is configured to shift one or both of a TX and an RX portion of the BT RX-TX transaction by the determined shift to allow for BT communications scheduling.

12. The communication device of claim 9, wherein the BT interface is configured to shift a TX portion of the BT RX-TX transaction by the determined shift to coordinate reception of the TX portion with a TX subframe period of the cellular communications and to leave an RX portion of the BT RX-TX transaction unchanged.

13. The communication device of claim 9, wherein the BT interface is configured to shift an RX portion of the BT RX-TX transaction by the determined shift to coordinate reception of the RX portion with a RX subframe period of the cellular communications and to leave a TX portion of the BT RX-TX transaction unchanged.

14. The communication device of claim 9, wherein the BT interface is configured to adjust a payload of a respective TX packet of the TX portion of the BT RX-TX transaction for an air time of the respective TX packet to be one slot.

15. The communication device of claim 9, wherein the BT interface is configured to use the packet type and the packet duration to affect the desired shift of the RX portion of the BT RX-TX transaction based upon a schedule of a long term evolution (LTE) communication obtained by the communication interface.

16. The communication device of claim 9, wherein the BT interface is configured to determine a slot pattern for transmitting a BT page message and to receive a page response based upon a schedule of a long term evolution (LTE) communication obtained by the communication interface.

17. A communication system comprising:
a communication device coupled via a cellular network to a cellular base station;
a number of Bluetooth (BT) clients coupled via a personal area network (PAN) to the communication device, wherein the communication device is configured to support coexisting BT and cellular communications and comprises:
a communication interface configured to determine a shift associated with a BT receive-transmit (RX-TX) transaction to avoid a concurrent BT RX with a cellular TX and a concurrent BT TX with a cellular RX, the shift being based upon a schedule for the cellular communications obtained from a cellular interface; and
a BT interface configured to:
shift a portion of the BT RX-TX transaction based upon the determined shift; and
determine a size of a BT transmit window and a BT transmit window offset adaptively based upon a schedule of a long term evolution (LTE) communication.

18. The communication device of claim 17, wherein the BT interface is configured to adjust a payload of a respective TX packet of the TX portion of the BT RX-TX transaction for an air time of the respective TX packet to be one slot.

19. The communication device of claim 1, wherein a BT connection interval occurs after a delay interval plus a predetermined time interval, the delay interval being a function of the determined size of the BT transmit window and the BT transmit window offset.

20. The communication device of claim 17, wherein a BT connection interval occurs after a delay interval plus a predetermined time interval, the delay interval being a function of the determined size of the BT transmit window and the BT transmit window offset.

* * * * *